United States Patent [19]

Sugiyama et al.

[11] Patent Number: 4,829,525
[45] Date of Patent: May 9, 1989

[54] PCM SIGNAL REPRODUCING APPARATUS INCLUDING ERROR/ERASURE CORRECTION CIRCUIT

[75] Inventors: Kazuhiro Sugiyama; Ken Onishi, both of Kyoto; Tohoru Inoue, Kanagawa, all of Japan

[73] Assignee: Mitsubishi Denki Kabushiki Kaisha, Japan

[21] Appl. No.: 112,035

[22] Filed: Oct. 23, 1987

[30] Foreign Application Priority Data

Oct. 24, 1986 [JP] Japan .................................. 61-253337
Jun. 15, 1987 [JP] Japan .................................. 62-149446
Jun. 15, 1987 [JP] Japan .................................. 62-149447
Jun. 15, 1987 [JP] Japan .................................. 62-149448

[51] Int. Cl.⁴ ............................................. G06F 11/10
[52] U.S. Cl. .......................................... 371/38; 371/37
[58] Field of Search ...................... 371/38, 37, 39, 40

[56] References Cited

U.S. PATENT DOCUMENTS

| 4,682,333 | 7/1987 | Onishi ................................... 371/38 |
| 4,706,250 | 11/1987 | Patel ..................................... 371/38 |
| 4,730,321 | 3/1988 | Machado ............................ 371/38 |
| 4,733,396 | 3/1988 | Baldwin ............................... 371/38 |
| 4,745,604 | 5/1988 | Patel ..................................... 371/38 |

FOREIGN PATENT DOCUMENTS 0136604 4/1085 European Pat. Off. .
0169540 1/1986 European Pat. Off. .
0217292 8/1987 European Pat. Off. .
3032673 8/1979 Fed. Rep. of Germany .
3241950 11/1981 Fed. Rep. of Germany .

*Primary Examiner*—Michael R. Fleming
*Attorney, Agent, or Firm*—Lowe, Price, LeBlanc, Becker & Shur

[57] ABSTRACT

A digital signal reproducing apparatus reproduces coded digital signal data which have been recorded on a magnetic tape. The digital signal reproducing apparatus includes first and second decoders. These decoders perform the error correction and erasure correction. The second decoder has a higher error detection capability than that of the first decoder. The reproducing apparatus further includes a checking circuit for checking code errors contained in the coded digital signal data. When the code errors detected by the checking circuit may occur simultaneously, a first editing-point detection signal is produced. When the first editing-point detection signal is output, a judgement is done that the editing-point may exist in the digital signal data, and the first decoder is changed to the second decoder for a predetermined time period. When the second decoder detects correction-prohibited data portion, a second editing-point detection signal. Upon receipt of the second editing-point detection signal, the cross-fade process is carried out for the digital signal data by an editing processor.

20 Claims, 17 Drawing Sheets

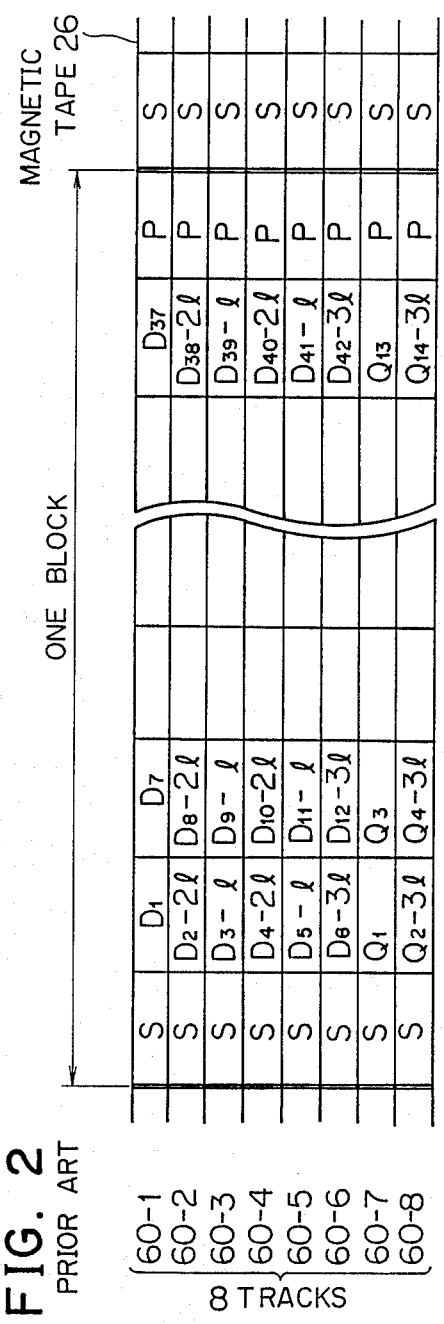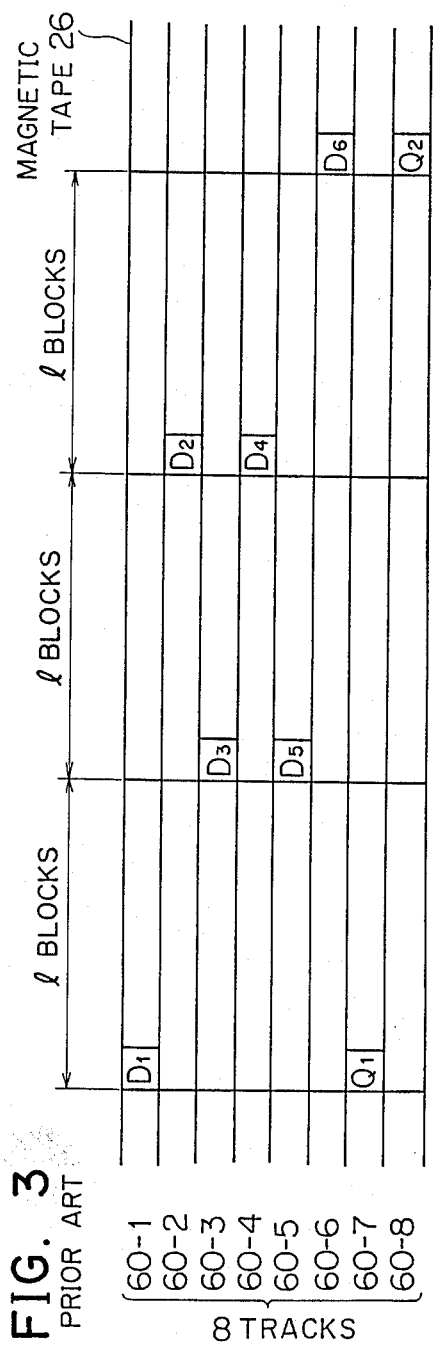
FIG. 2 PRIOR ART
FIG. 3 PRIOR ART

RECORDING FORMAT (FRAME)

RECORDING FORMAT (BLOCK)

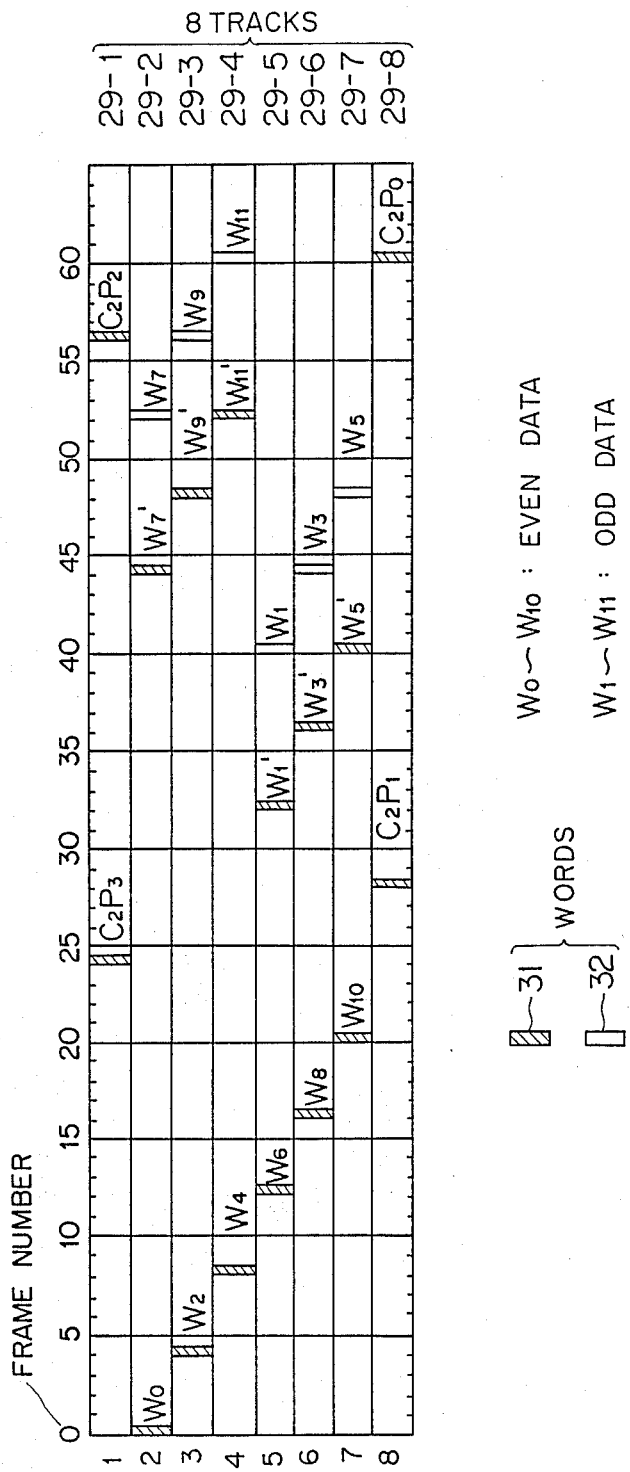

FIG. 10A

1st C2 DECODER

ERROR NUMBER →

ERASURE NUMBER ↓

| | 0 | 1 | 2 | 3 | 4 | 5~15 |
|---|---|---|---|---|---|---|
| 0 | C | C | C | B/M | B/M | B/M |
| 1 | C | C | B/M | B/M | B/M | B/M |
| 2 | C | C | B/M | B/M | B/M | B/M |
| 3 | C | B/M | B/M | B/M | B/M | B/M |
| 4 | C | B/M | B/M | B/M | B/M | B/M |
| 5~15 | A/M | A/M | A/M | A/M | A/M | A/M |

FIG. 10B

2nd C2 DECODER

ERROR NUMBER →

ERASURE NUMBER ↓

| | 0 | 1 | 2 | 3 | 4 | 5~15 |
|---|---|---|---|---|---|---|
| 0 | C | C | B | B | B/M | B/M |
| 1 | C | B | B | B/M | B/M | B/M |
| 2 | C | B | B/M | B/M | B/M | B/M |
| 3 | C | B/M | B/M | B/M | B/M | B/M |
| 4 | B/M | B/M | B/M | B/M | B/M | B/M |
| 5~15 | B/M | B/M | B/M | B/M | B/M | B/M |

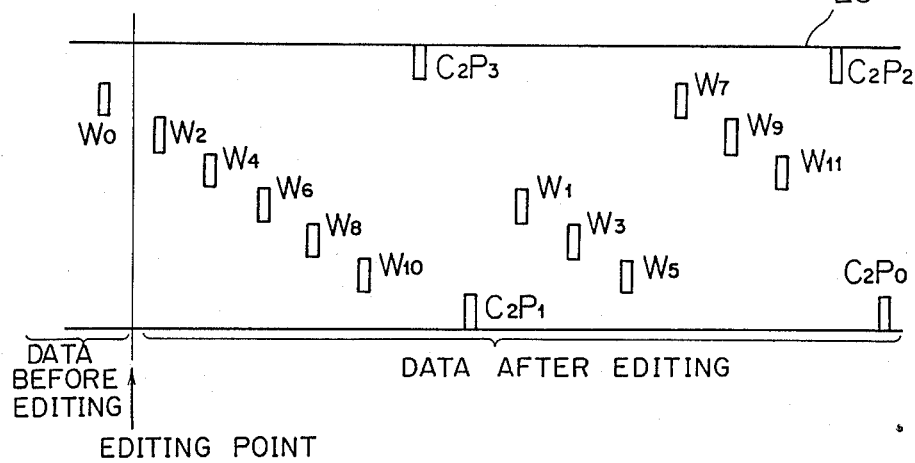
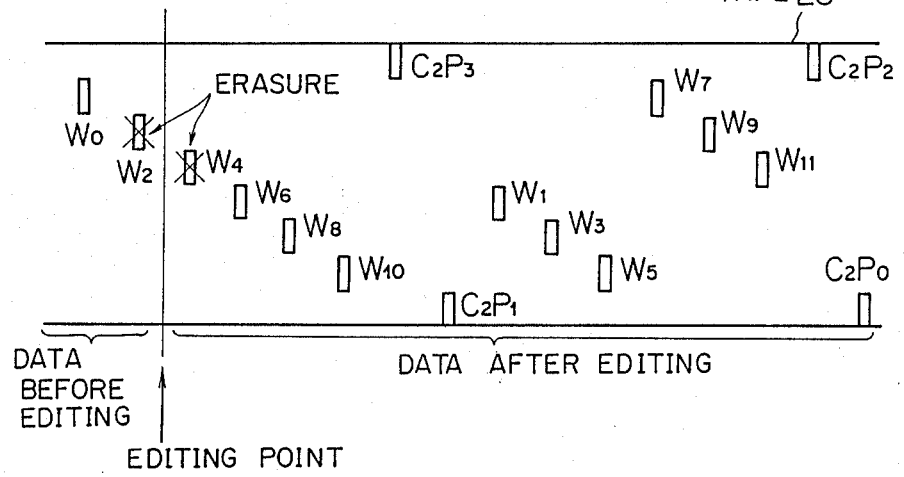

FIG. 13A

1st C2 DECODER — ERROR NUMBER →

ERASURE NUMBER ↓

| | 0 | 1 | 2 | 3 | 4 | 5–15 |
|---|---|---|---|---|---|---|
| 0 | C | C | C | B/M | B/M | B/M |
| 1 | C | C | B/M | B/M | B/M | B/M |
| 2 | C | C | B/M | B/M | B/M | B/M |
| 3 | C | B/M | B/M | B/M | B/M | B/M |
| 4 | C | B/M | B/M | B/M | B/M | B/M |
| 5–15 | A/M | A/M | A/M | A/M | A/M | A/M |

FIG. 13B

2nd C2 DECODER — ERROR NUMBER →

ERASURE NUMBER ↓

| | 0 | 1 | 2 | 3 | 4 | 5–15 |
|---|---|---|---|---|---|---|
| 0 | C | B | B | B | B | B/M |
| 1 | C | B | B | B | B/M | B/M |
| 2 | C | B | B | B/M | B/M | B/M |
| 3 | C | B | B/M | B/M | B/M | B/M |
| 4 | B | B/M | B/M | B/M | B/M | B/M |
| 5–15 | B/M | B/M | B/M | B/M | B/M | B/M |

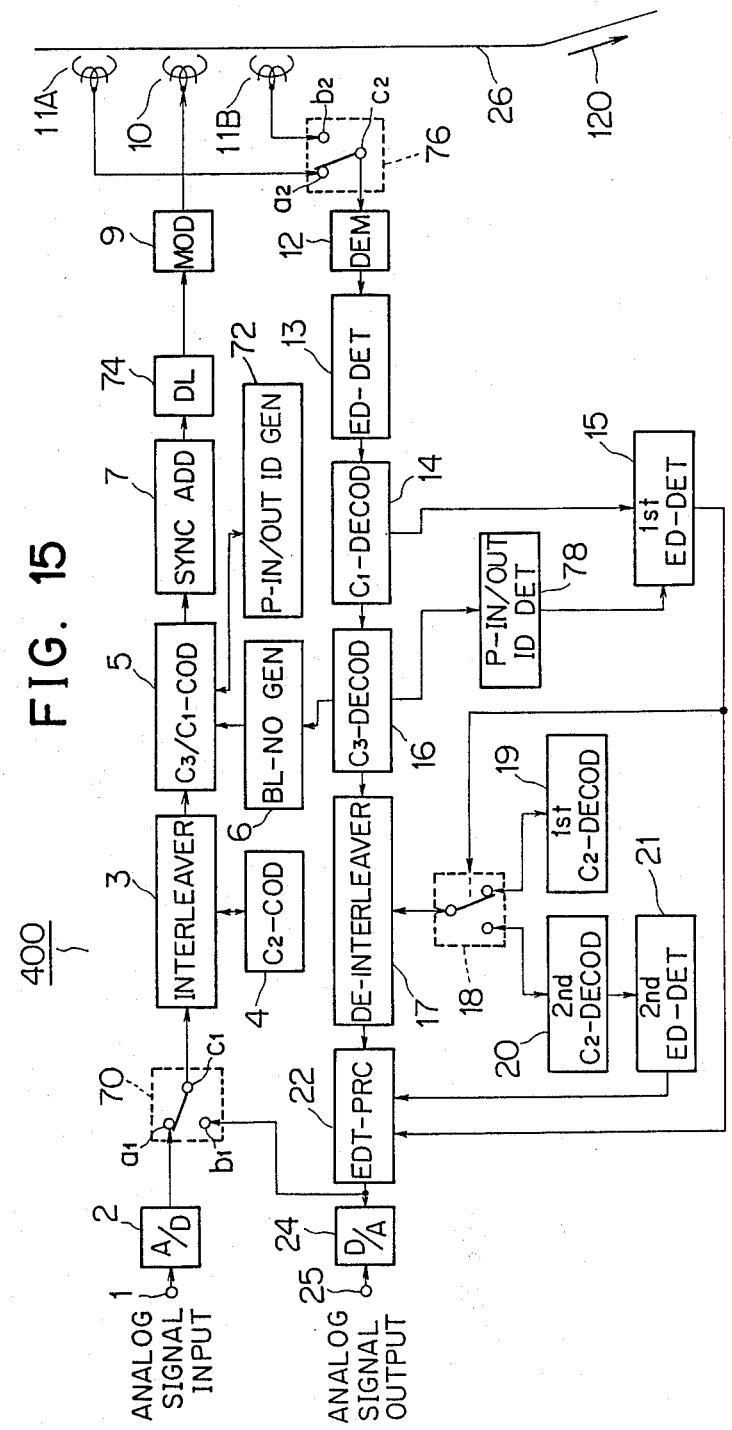

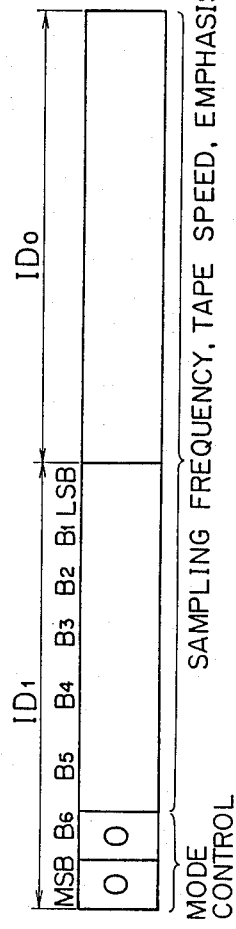
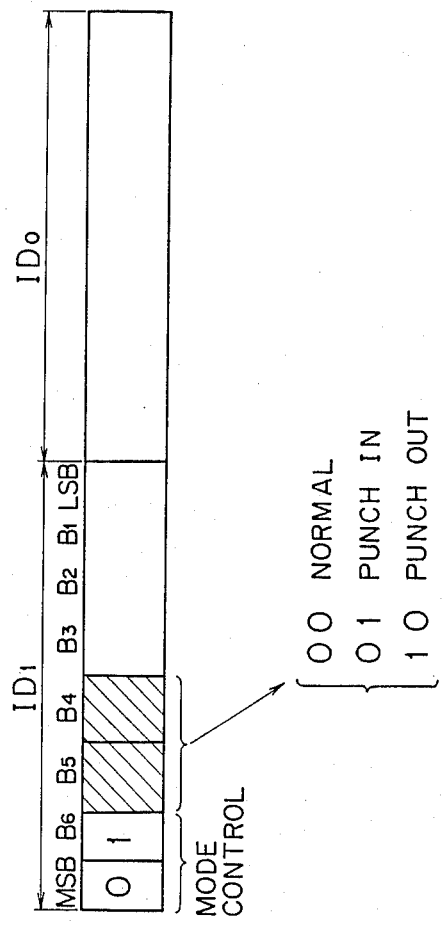
FIG. 16A
FIG. 16B

FIG. 17A

1st C2 DECODER — ERROR NUMBER →

ERASURE NUMBER ↓

| | 0 | 1 | 2 | 3 | 4 | 5–15 |
|---|---|---|---|---|---|---|
| 0 | C | C | C | B/M | B/M | B/M |
| 1 | C | C | B/M | B/M | B/M | B/M |
| 2 | C | C | B/M | B/M | B/M | B/M |
| 3 | C | B/M | B/M | B/M | B/M | B/M |
| 4 | C | B/M | B/M | B/M | B/M | B/M |
| 5–15 | A M | A/M | A/M | A/M | A/M | A/M |

FIG. 17B

2nd C2 DECODER — ERROR NUMBER →

ERASURE NUMBER ↓

| | 0 | 1 | 2 | 3 | 4 | 5–15 |
|---|---|---|---|---|---|---|
| 0 | C | C | B | B | B/M | B/M |
| 1 | C | B | B | B/M | B/M | B/M |
| 2 | C | B | B/M | B/M | B/M | B/M |
| 3 | C | B/M | B/M | B/M | B/M | B/M |
| 4 | B/M | B/M | B/M | B/M | B/M | B/M |
| 5–15 | B/M | B/M | B/M | B/M | B/M | B/M |

PCM SIGNAL REPRODUCING APPARATUS INCLUDING ERROR/ERASURE CORRECTION CIRCUIT

BACKGROUND OF THE INVENTION

1. Field of the Invention

The present invention generally relates to a digital signal reproducing apparatus for a PCM (Pulse Code Modulation) signal recorded on a recording medium such as a magnetic tape, and, more particularly to a digital signal processing apparatus where digital data recorded on the magnetic tape has been edited and the edited digital data is processed.

2. Description of the Related Art

The above-described digital signal recording and/or reproducing apparatus has been recently, widely developed such as digital audio tape recorders (DAT). In the known digital signal recording and/or reproducing apparatus, not only the editing process, e.g., the splice editing, or tape cut editing, but also. the punch-in/punch-out operations are required. In the punch-in/punch-out operations, the digital signal having the continuous relationship. with the original digital signal can be recorded on the original digital signal previously-recorded on the magnetic tape.

One of the conventional digital signal recording/reproducing apparatus is disclosed in, for instance, Japanese KOKOKU (examined) patent application No. 60-51176 (publication date: Nov. 12, 1985), which is capable of the editing process.

The circuit arrangement of the above-described conventional digital signal recording/reproducing apparatus will now be described.

In FIG. 1, there is shown a digital signal recording-/reproducing apparatus including as the signal recording system, an analog signal input terminal 1, and an analog-to-digital (A/D) converter 2 for converting the analog signal derived from a signal source (not shown in detail) and supplied therefrom via the analog signal input terminal 1, into the corresponding digital signal. The apparatus shown in FIG. 1 further includes a Q-coding circuit 50 for performing the error-correction coding of the PCM (Pulse Code Modulation) signal, or data supplied from the A/D converter 2; a track distributing circuit 51 for distributing the PCM signal into a plurality of signal channels; an interleaving circuit 52 for delaying the respective PCM signals distributed in the multi-track with giving different delay times; a P-coding circuit 53 for adding error detecting code to a certain number of the respective track signals; a modulating circuit 9 for modulating the P-coded PCM signal to obtain the desirable digital signal (data); and a recording head 10 constructed by multi-track heads for recording the desirable digital signal on a magnetic tape 26.

In the signal reproducing system of the recording/reproducing apparatus, there are provided a reproducing head 11 for reproducing the digital signal (data) from the magnetic head tape 26; a demodulating circuit 12 for demodulating the signal reproduced from the reproducing head 11 to obtain the PCM signal; a P-code checking circuit 54 for checking the reproduced PCM signal; a first editing-point detector 15 for detecting the first editing point based upon the checking results of the P-code checking circuit 54; a de-interleaving circuit 55 for de-interleaving the PCM signal which has been interleaved in the signal recording system; and a track synthesizing circuit 56 for changing the multi-track PCM signal into a time sequential signal. The recording/reproducing apparatus further includes a Q-code decoding circuit 57 for performing the error correction for the time sequential signal. The digital signal recording/reproducing apparatus further includes a second editing-point detector 22 for detecting an editing point based upon the detection result of the Q-code decoding circuit 57; an editing process circuit 23 for electrically connecting the PCM signals adjacent to the editing point without causing a signal level jump in response to control signals derived from the first and secod editing-point detectors 15 and 22, respectively, a digital-to-analog (D/A) converter 24 for D/A-converting the edited digital signal data into a corresponding analog signal; and an analog signal output terminal 25 connected to the D/A converter 24.

FIG. 2 illustrates a data recording format of the magnetic tape 24 employed in the recording/reproducing apparatus. Reference numerals 60-1 to 60-8 indicate the recording tracks, i.e., eight (8) tracks. Assuming that the PCM signal train which has been A/D-converted and processed into a time sequential signal, is "Dn", several blocks of time delays for each track ("l" unit in FIG. 2) are given to this PCM signal train "Dn", and thus the delayed signals are arranged in the form as shown in FIG. 2. In the recording track 60-1, the error checking code (i.e., a cyclic redundancy check code, CRCC) "P" is added to the PCM signals $D_1$, $D_7$, - - - $D_{37}$, and, furthermore, the sync signal "S" is superimposed therewith, thereby forming a single frame. It is obvious that the remaining recording tracks 60-2 to 60-6 have the same frame arrangements. However, in the recording track 60-7, the error checking code "P" is superimposed on check symbols $Q_1$, $Q_3$, - - - , $Q_{13}$ of the error correction code (i.e., Reed-Solomon code) which has been added to a predetermined PCM signal train, and also the sync signal "S" is added thereto so as to form another frame. The signal arrangement of the recording track 60-8 is similar to that of the recording track 60-7. It should be noted that a combination of the recording tracks 60-1 to 60-8 is so-called as a "block".

For the sake of easy understanding, FIG. 3 illustrates arrangements of the PCM signal and the check symbol Q of the correction code. As previously described, the time-sequentially arranged PCM signal series $D_n$ are separately arranged with several l blocks as shown in FIG. 3. This is so-called as an "interleaving", which owns a first function to disperse errors caused by scratches and defects of the magnetic tape. This interleaving has another function in that both the PCM signal located before the editing point on the recorded digital signal data and the PCM signal located after the editing point are duplicated for a predetermined time period by employing correction means (not shown), and the digital data before the editing point is faded out whereas the digital data after the editing point is faded in so as to perform the signal cross-fade, whereby the digital signals before and after the editing point can be electrically connected to each other smoothly as to the signal levels.

Error correction code for the digital signal recording/reproducing apparatus shown in FIG. 1 will now be described. The error checking code "P" for the magnetic tape's longitudinal direction is equal to (200,224) code on GF(2), whereas the error checking code "Q" for the magnetic tape's transversal direction is equal to (8,6) Reed-Solomon code on $GF(2^4)$. First $GF(2)$ corresponds to a Galois field having elements 0 and 1, and second $GF(2^4)$ corresponds to a Galois field having element of $2^4$. It should be noted that (n,k) code implies the code defined by the code length "n" and the information symbol "K". The P-code is CRCC and the generating polynominal is given as follows.

$$G(X) = X^{16} + X^{12} + X^5 + 1 \text{ (mod 2)} \quad (1)$$

Further, the parity check information of the Q code and the codes $Q_1$ and $Q_2$ are given by the below-mentioned equations.

$$Q_1 = \sum_{i=1}^{6} Di \cdot \alpha i \quad (2)$$

$$Q_2 = \sum_{i=1}^{7} Di \quad (3)$$

where $\alpha i$ (i=1 to 6) is the element on $GF(2^3)$.

The multiply code for the P-code and Q-code owns the following correction capability.

(A). When there is no track error, the detection result implies no error in both the P-code and Q-code.

(B). When there is one track error, a detection is made which track contains the error by utilizing the Q-code, and thus the error correction is performed.

(C). When there are two track errors, these track errors are corrected by utilizing the information of the error track for the P-code and the information of the error track for the Q-code.

(D). Where there are more than three track errors, the PCM signal (i.e., the digital signal data) belonging to these erroneous tracks, is concealed by utilizing the track information for the P-code.

It should be understood that "error correction" means that the PCM signal of the erroneous track is returned to the original correct PCM signal, whereas "error concealment" implies that the PCM signal of the erroneous track is error-concealed by utilizing the PCM signals located before and after this erroneous PCM signal to produce a PCM signal analogous to the original correct signal.

Operations of the digital signal recording/reproducing apparatus, as illustrated in FIG. 1, will now be described.

The analog signal supplied to the analog signal input terminal 1 is A/D-converted into the corresponding PCM signal series by the A/D converter 2. In the Q-coding circuit 50, the checking symbols "Qn" produced by the previous equations (2) and (3) are added, or superimposed on this PCM signal series "Dn". Then, the PCM signal series is so arranged in the PCM signal arrangement by the track distributing circuit 51 and the interleaving circuit 52 as illustrated in FIGS. 2 and 3. In addition, the checking code of the CRCC codes produced by the generating polynominal as defined by equation (1), is added to the above-described PCM signal series of each signal track in the P-coding circuit 53. Furthermore, the sync signal "S" is also added to this PCM signal series for each signal track, and thereafter, the resultant PCM signal series is transferred to the modulation circuit 9. In the modulation circuit 9, the input PCM signal series is modulated by employing a proper modulation signal to obtain the modulated PCM signal series recordable on the magnetic tape 26. The recording magnetic head 10 records the modulated PCM signal series on the magnetic tape 26.

Reproducing operations for the digital signal recording/reproducing apparatus illustrated in FIG. 1 will now be described.

The digital data signal recorded on the magnetic tape 26 is reproduced by the reproducing magnetic head 11 and then converted into a PCM signal by the demodulating circuit 12. The PCM signal is error-detected in the P-code checking circuit 54, and thereafter, transferred via the de-interleaving circuit 55 and the track synthesizing circuit 56 to the Q-code decoding circuit 57. The PCM signal transferred to the Q-code decoding circuit 57 is again error-detected, and error-corrected therein to obtain a time-sequential PCM signal "Dn".

When reproducing no tape-cut editing, or splice editing tape 26, the PCM signal output from the Q-code decoding circuit 57 is directly derived from the editing process circuit 23 without signal processing and then, D/A-converted by the D/A converter 24 into the corresponding analog signal. The resultant analog signal is output from the analog signal output terminal 25.

Reproducing the tape-cut editing tape 26, the first editing-point detecting circuit 15 produces a first editing-point detecting signal when the P-code checking circuit 54 detects that the signal frame of each track simultaneously contains a plurality of track errors because the tape-cut editing is performed for cutting the tape in the vertical direction with respect to the travel (longitudinal) direction of the magnetic tape 26. On the other hand, reproducing the tape-cut editing point in the code, the second editing-point detector 22 produces a second editing-point detection signal when the continuity of the codes located before and after the editing point is not maintained and the P-code check result is not coincident with the error information obtained by the Q-code. The editing process circuit 23 judges existence of the editing point when the first editing-point detection signal is output and also the second editing-point detection signal is output during a predetermined time period just after outputting the first editing-point detection signal. Both the PCM signal before the editing point and the PCM signal after the editing point are duplicated for a given time period by utilizing the correction means, both the PCM signals are cross-faded smoothly so as to avoid the signal jump. The output from the editing process circuit 23 is D/A-converted in the D/A converter 24 into the corresponding analog signal which is then output from the analog signal output terminal 25.

The error correction is performed in the following manner by the conventional digital signal recording/reproducing apparatus with the above-described circuit arrangement.

FIG. 4 illustrates the data error condition before and after the tape-cut editing point. Symbols $D_1$ and $Q_1$ indicate the data before the editing point, whereas symbols $D_2$, $D_3$, $D_4$, $D_5$, $D_6$ and $Q_2$ denote the data after the editing point. When reproducing the magnetic tape 26, the error is detected by the P-code check circuit 54 due to the scratches caused by the tape-cut editing in the data $D_3$ and $Q_1$, and Q-code decoding circuit 57 performs the above-defined correction capability (C). That is to say, two track errors are corrected by utilizing the information ($D_3$, $Q_1$) of the error track by the P-code, and the error information by the Q-code. In this case, there is, however, a drawback that although the data $D_1$ before the editing point has no relationship with the data $D_2$ to $D_6$ after the editing point, the data $D_3$, $Q_1$ is corrected based upon this data $D_1$, resulting in the error correction. Since a large quantity of errors are produced around the tape-cut editing point on the digital data track, which causes a degree of the error detection by the P-code to be increased, and also the data located before and after the editing point and having no relationship with each other is handled as one piece of code, there are great possibilities to cause the error pattern as illustrated in FIG. 4.

With the above-described circuit arrangement of the digital signal recording/reproducing apparatus, both the error correcting function and the code discontinuities detecting function are required. The former function is to correct the errors produced by recording and reproducing the magnetic tape 26, whereas the latter function is to detect the code discontinuities (i.e., non-correction data portion, or correction-prohibited data portion of the digital signal data) before and after the tape cut editing point. In other words, the error correction must be performed while the correction capability belonging to the code is maximized in the error correcting function, whereas similarly, the detection for the correction-prohibited data portion is surely performed. As a result, if the decoding algorithm for satisfying the former function is employed in the recording/reproducing apparatus, no detection is made for the correction-prohibited data portion of the codes over the tape-cut editing point, and therefore, correction is mistakenly performed. To the contrary, if another decoding algorithm for satisfying the code discontinuities detecting function is employed, the error correction capability is deteriorated although the correction-prohibited data portion is surely performed. Accordingly, problems may occur in the normal signal reproducing. That is to say, there is a trade-off relationship between the error correction function and the detection function of the correction-prohibited data portion of the digital signal data.

Furthermore, the digital signal recording/reproducing apparatus has another drawback that no error correction is performed during the punch in/out operations.

The present invention has been accomplished in an attempt to solve the above-described conventional drawbacks, and therefore, has an object to provide a digital signal recording/reproducing apparatus where, in the reproducing operation, the error correction can be performed while the error correcting capability belonging to the code is maximized, and simultaneously the editing-point detection is surely performed.

SUMMARY OF THE INVENTION

The object of the present invention is accomplished by providing a digital signal reproducing apparatus comprising:

a magnetic head 11 for reproducing digital signal data containing at least main signal data, an error detecting code, and an error correcting code, from multi-tracks of a recording tape 26;

a checking circuit 54 for checking the error detecting code from the reproduced digital signal data to produce a checking signal;

a first editing-point detecting circuit 15 for receiving the checking signal from the checking circuit 54 to produce a first editing-point detection signal;

a first decoding circuit 80A having an error correcting capability, for decoding the digital signal data derived from the checking circuit 54 so as to correct the main signal data based upon the error correcting code;

a second decoding circuit 80B having an error detecting capability, for decoding the digital signal data derived from the checking circuit 54 so as to detect the error detecting code;

a second editing-point detecting circuit 22 for producing a second editing-point detection signal when the second decoding circuit 80B detects the error detecting code from the digital signal data;

an editing circuit 23 for editing the digital signal data when at least one of said first and second editing-point detection signals are produced; and selecting members 82;84 for selecting one of the first and second decoding circuits 80A;80B to be operative based upon the first editing-point detecting signal.

BRIEF DESCRIPTION OF THE DRAWINGS

For a better understanding of the above and other objects of the present invention, reference is made to the following detailed description of the invention to be read in conjunction with the following drawings, in which:

FIG. 2 schematically shows the data recording format of the magnetic tape employed in the apparatus illustrated in FIG. 1;

FIG. 3 schematically shows the conventional interleaved data recorded on the magnetic tape employed in the apparatus shown in FIG. 1;

FIG. 8 illustrates the interleaved data format employed in the apparatus 200 shown in FIG. 6;

FIGS. 10A and 10B schematically illustrate the error correction/detection ranges of the first and second $C_2$ decoders employed in the recording/reproducing apparatus 200;

FIGS. 11A and 11B schematically illustrates the error patterns containing the editing points for the recording/reproducing apparatus 200 shown in FIG. 9;

FIGS. 13A and 13B schematically illustrate the error correction/detection ranges of the first and second $C_2$ decoders employed in the recording/reproducing apparatus 300;

FIG. 15 is a schematic block diagram of the digital signal recording/reproducing apparatus 400 according to the third preferred embodiment of the invention;

FIGS. 16A and 16B illustrate the identification data format employed in the recording/reproducing apparatus 400;

FIGS. 17A and 17B schematically illustrate the error correction/detection ranges of the first and second $C_2$ decoders employed in the recording/reproducing apparatus 400; and, FIGS. 18A and 18B schematically illustrate the error patterns containing the editing points which have been formed during the punch in/out operation.

DETAILED DESCRIPTION OF THE PREFERRED EMBODIMENTS

BASIC IDEA

Before proceeding with the various types of preferred embodiments according to the invention, a basic idea of the present invention will now be summarized.

CIRCUIT ARRANGEMENT

Figure 5:
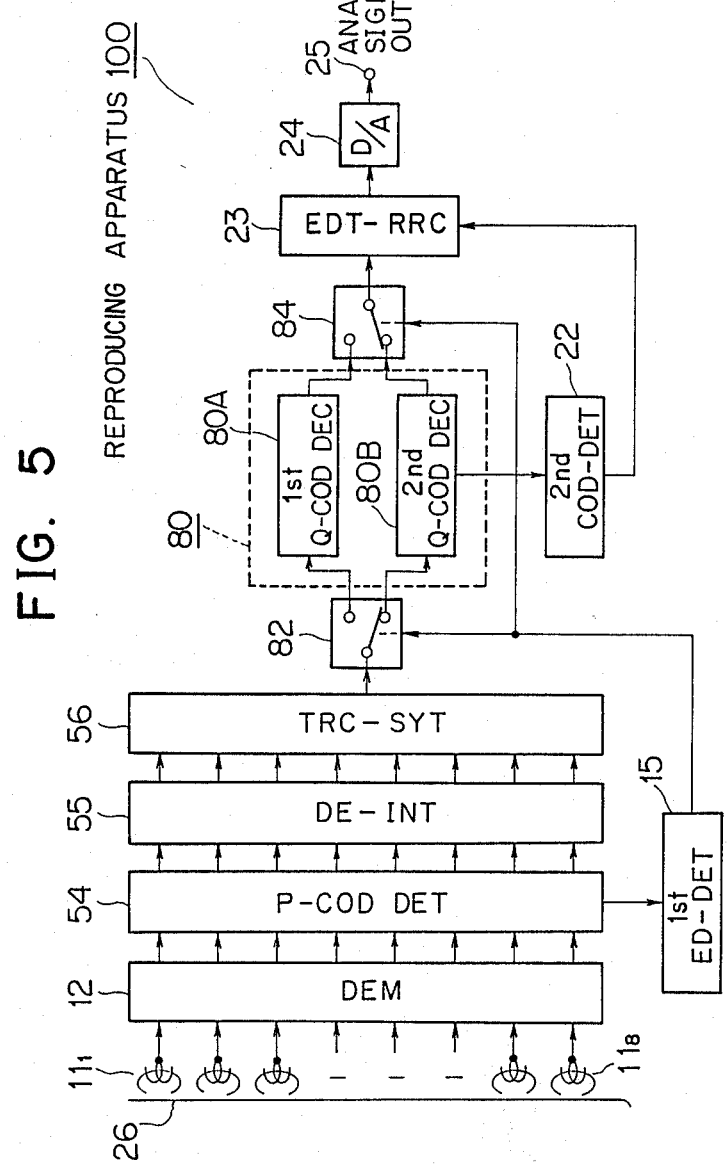
FIG. 5 is a schematic block diagram of the digital signal reproducing apparatus 100 embodying the basic idea of the present invention.

In FIG. 5, there is shown a circuit block diagram of a digital signal reproducing apparatus 100 according to the basic idea of the present invention. For the sake of simplicity, the circuit diagram of the corresponding digital signal recording apparatus is omitted because it corresponds to the recording system shown in FIG. 1.

It should be noted that the same reference numerals shown in FIG. 1 will be employed as those for denoting the same, or similar circuit elements shown in the following figure.

In the digital signal reproducing apparatus 100 as illustrated in FIG. 5, there is provided a reproducing magnetic head 11 for reproducing the PCM signal (i.e., the digital signal, or digital signal data) which has been modulated, for instance, in the MFM (Modified Frequency Modulation) form and recorded on the magnetic tape 26. In the preferred embodiment, the reproducing head 11 is of the 8-channel head which is constructed of 8 reproducing magnetic heads $11_1$ to $11_8$.

The digital signal reproducing apparatus 100 further includes a demodulating circuit 12 for demodulating the reproduced output from the reproducing head 11 to produce a PCM (Pulse Code Modulation) signal; a P-code checking circuit 54 for checking an error checking code (referred to as a "P-code") contained in the reproduced PCM signal; a de-interleaving circuit 55 for de-interleaving the digital data which has been delayed in each signal track; a track synthesizing circuit 56 for arranging the multitrack PCM signal into the time sequential signal; a Q-code decoding circuit 80 for error-correcting an error correcting code (referred to as a "Q-code"); a first editing-point detector 15 for detecting the editing point in response to the detection result from the P-code checking circuit 54; a second editing-point detector 22 for detecting the editing point in response to the detection result from the Q-code decoding circuit 80; an editing process circuit 23 for electrically connecting the PCM signals around the editing point without the signal level jump based upon the control signals, i.e., the first and second editing-point detection signals derived from the first and second editing-point detectors 15 and 22; a digital-to-analog (D/A) converter 24; and an analog signal output terminal 25. Moreover, in the digital signal recording/reproducing circuit 100, a first changeover switch 82 is interposed between the track synthesizing circuit 56 and the Q-code decoding circuit 80, and a second changeover switch 84 is interposed between the Q-code decoding circuit 80 and the editing process circuit 23. These changeover switches 82 and 84 are under control in response to the control signal from the first editing-point detector 15.

As is apparent from the circuit diagram of FIG. 5, the Q-code decoding circuit 80 is arranged by a first error correction decoding circuit 80A having a higher error correcting capability, and a second error correction decoding circuit 80B having a higher error detecting capability. The output of the second error correction decoding circuit 80 is transferred to the second editing-point detector 22 so as to detect the second editing-point.

REPRODUCING OPERATION

Operations of the above-described digital signal reproducing 100 will now be described.

Figure 1:
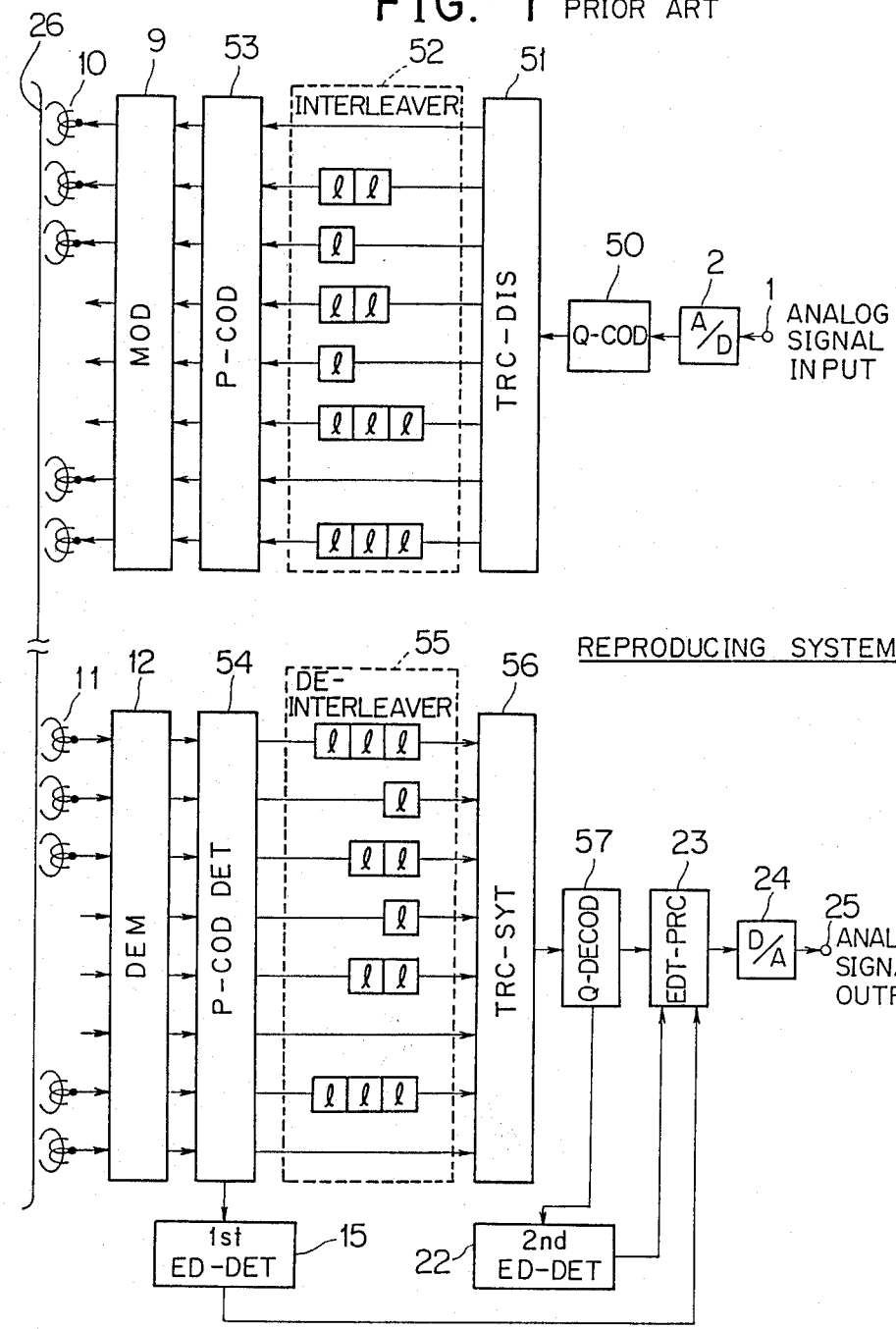
FIG. 1 is a schematic block diagram of the conventional digital signal recording/reproducing apparatus.
Figure 4:
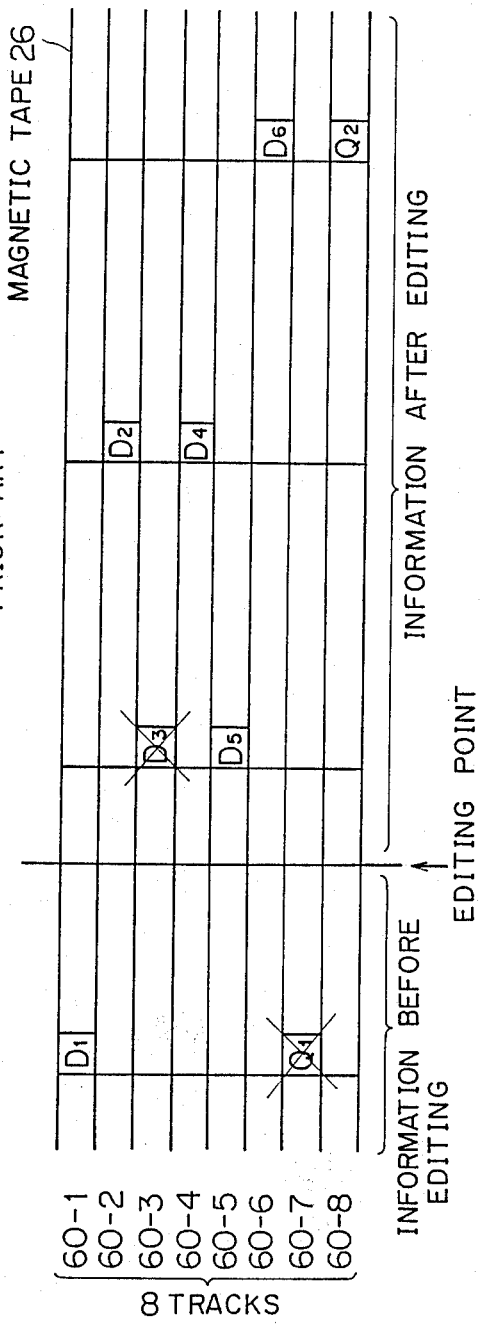
FIG. 4 schematically shows the error pattern on the magnetic tape employed in the apparatus shown in FIG. 1.

First, the PCM signal recording operation on the magnetic tape 26 will be summarized with reference to the recording system shown in FIG. 1.

The analog signal input into the input terminal 1 is A/D-converted by the A/D converter 2 into the PCM signal. In the Q-coding circuit 50, the checking symbol "Q" is added to this PCM signal series "Dn". The resultant PCM signal series is processed in the track distributing circuit 51 and the de-interleaving circuit 52 so as to convert the signal arrangement of the PCM signal as illustrated in FIGS. 2 and 3. The P-code is added to the PCM signal in each signal channel in the P-code coding circuit 53, and moreover, the sync signal "S" is added thereto, and finally, the processed PCM signal is transferred to the modulation circuit 9. In the modulation circuit 9, the processed PCM signal is modulated into the digital signal recordable on the magnetic tape 26. Then, this digital signal is recorded on the magnetic tape 26 by means of the recording magnetic head 10.

The signal reproducing operation of the reproducing apparatus 100 will now be described.

The signal reproduced by the reproducing head 11 from the magnetic tape 26 is converted into the PCM signal in the demodulating circuit 12, and error-detected in the P-code checking circuit 54. Furthermore, the resultant PCM signal is further processed in the de-interleaving circuit 55 and track synthesizing circuit 56. In response to the control signal from the first editing-point detector 15, either the error detection, or the error correction is performed by selecting the changeover switches 82 and 84 to operate either the first Q-code decoding circuit 80A, or the second Q-code decoding circuit 80B, so that the time sequential PCM signal is obtained from the editing process circuit 23.

NO EDITING-POINT REPRODUCTION

When reproducing the normal magnetic tape 26 having no editing point, e.g., no slice editing tape, the first Q-code decoding circuit 80A having a higher error correction capability has been selected by actuating the first and second changeover switches 82 and 84, the error correction is performed while the error correction capability belonging to the Q-code is maximized, and the resultant PCM signal from the first Q-code decoding circuit 80A is output from the editing process circuit 23 without any editing process. This PCM signal (digital signal) output from the editing process circuit 23 is converted into the corresponding analog signal which will be output from the analog output terminal 25.

EDITING-POINT REPRODUCTION

When reproducing the magnetic tape 26 containing the tape-cut editing, in response to the control signal (the first editing-point detection signal) from the first editing-point detector 15 which receives the output signal from the P-code checking circuit 54, the change-over switches, i.e., the signal selectors 82 and 84 are changed into the switching state shown in FIG. 5 so as to select the second Q-code decoding circuit 80B having the higher error detecting capability. Since this second Q-code decoding circuit 80B owns the higher error detecting capability than that of the first Q-code decoding circuit 80A, the code discontinuities existing before and after the editing point can be detected when the tape cut editing point is present in the code, i.e., the digital signal data. That is to say, the second Q-code decoding circuit 80B can detect the correction prohibited portion of the digital signal data. In addition, the second editing-point detector 22 judges whether or not the correction-prohibited data portion continues over several blocks. If yes, then the editing process is required and the control signal (i.e., the second editing-point detection signal) from the second editing-point detector 22 is transferred to the editing process circuit 23. In response to the control signal derived from the second editing-point detector 22, the editing process circuit 23 performs the editing process. The output from the editing process circuit 23 is D/A-converted in the D/A converter 24 into the corresponding analog signal data. Then, this analog signal data is derived from the analog signal output terminal 25.

DETERMINATION OF SPLICE EDITING

Figure 6:
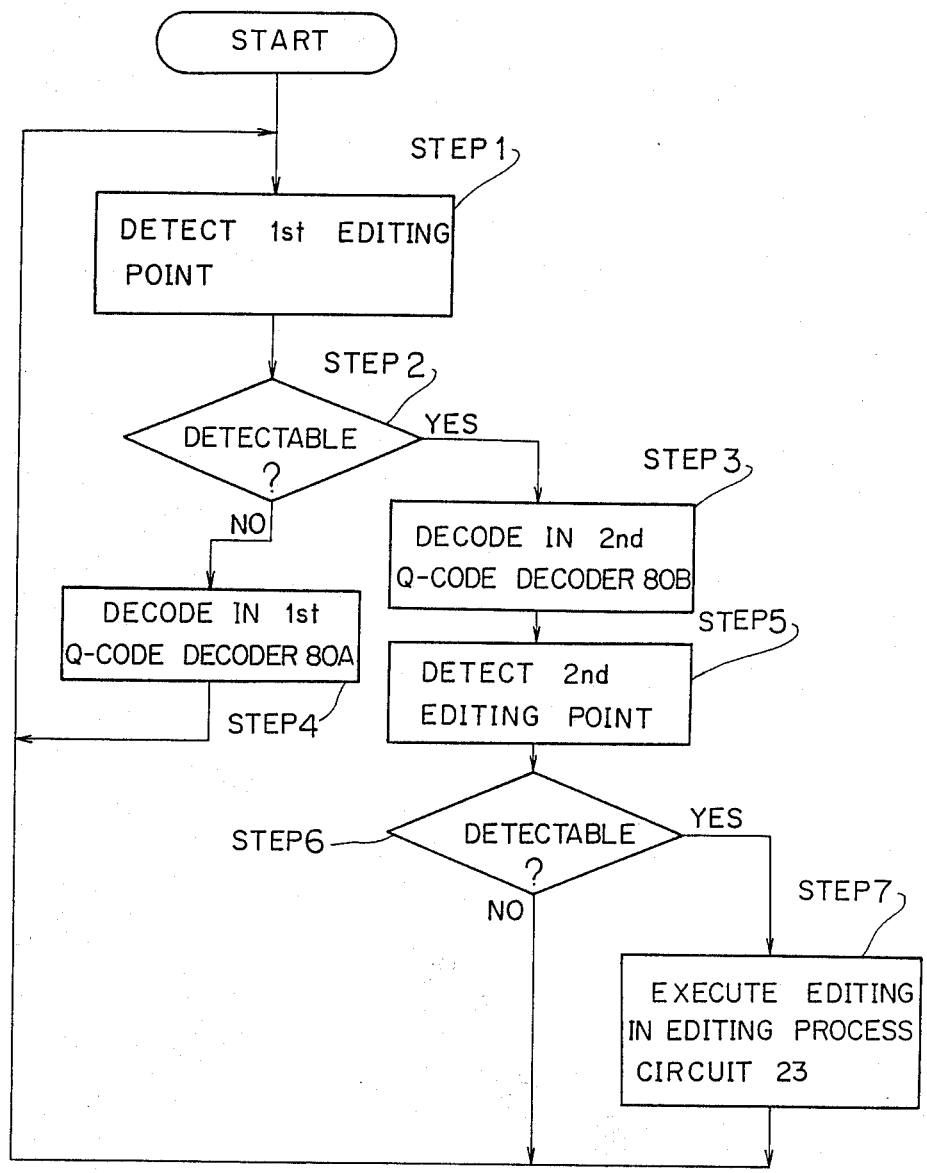
FIG. 6 illustrates a flowchart of the overall reproducing operation of the apparatus 100 shown in FIG. 5.

FIG. 6 illustrates a flowchart to explain the above-described splice (tape cut) editing-point judging process. In the flowchart shown in FIG. 6, first, the control signal, i.e, the first editing-point detection signal from the first editing-point detector 15 is checked (step 1). A control flow proceeds to judge whether or not this control signal is detected (step 2). If yes, the Q-code decoder is switched to the second Q-code decoding circuit 80B (step 3), whereas if no, then the first Q-code decoding circuit 80A is still brought into the operation. Accordingly, the checking process is returned to the first editing-point detector 15 (step 4). When, on the other hand, the second Q-code decoding circuit 80B is operated, a check is made of the control signal derived from the second Q-code decoding circuit 80B (step 5). A judgement is madewhether or not the control signal (i.e., the second editing-point detection signal) is detected (step 6). If yes, the editing process is excuted (step 7). If no, then the control flow returns to the starting point so as to check the first editing-point detection signal derived from the first editing-point detector 15.

It should be noted that even if the first control signal is detected by the first editing-point detector 15 and thus, the second Q-code decoding circuit 80B is brought into the operation, no editing process is executed and therefore, the normal signal reproduction is performed when a judgement is made that the second editing-point detector 22 detects the second control signal. As a result, although the error correction capability for the digital signal data is deteriorated, such a deterioration occurs instantaneously, resulting in no serious problem in view of the overall signal reproducing operation.

As has been described abve, in the digital signal reproducing apparatus 100 according to the present invention, the first editing-point detector detects the tape-cut editing point based upon the output from the error code checking circuit, and the digital data is input to the second error code decoding circuit which has been changed from the first error code decoding circuit. When the errors detected by the second editing-point detector exceeds a predetermined period, the digital data is edited in the editing process circuit in such a manner that the fade-in and fade-out signal process is performed for the digital data before and after the editing point without overall signal level changes so as to obtain the edited digital data having smooth signal levels.

According to the preferred embodiment of the invention, there are independently provided the first Q-code decoding circuit 80A having the higher error correction capability and the second Q-code detecting circuit 80B having the higher error detection capability. In response to the control signal derived from the first editing-point detector 15, one of these Q-code decoding circuits 80A and 80B is selectively operated. As a result, the proper editing process is performed when the splice editing point is detected, and the digital data is properly reproduced with the higher error correction capability and also the higher detecting precision for the slice editing points.

MODIFICATIONS

In the preferred embodiment, both the first and second Q-code decoding circuits 80A and 80B were separately employed. It is, however, possible to employ a programming control type decoding circuit where a first program of a decoding algorithm having a higher correction capability and a second program of a decoding algorithm having a higher error detection are selectively utilized. Accordingly, the quantity of the hardware is the same as that of the preferred embodiment (only one decoding circuit), and this programming control type decoder can have the advantage similar to the preferred embodiment.

DIGITAL SIGNAL RECORDING/REPRODUCING APPARATUS OPERATED IN FIRST MODE

A basic operation of digital signal recording/reproducing apparatus 200, according to a first preferred embodiment, operable in a first mode will now be summarized.

The digital signal recording/reproducing apparatus 200 operated in the first mode, according to the invention, is characterized by employing a first decoder for performing both the error correction (i.e., even if the missing is caused by the P-code, the error correction is carried out by the Q-code) and the erasure correction (i.e., the positional data detected by the P-code is corrected by the Q-code), and a second decoder having the higher error detection capability than that of the first decoder; and in that when the simultaneous code errors occur in the track more than a predetermined track number in the vertical direction with respect to the tape travel direction, and the first editing-point detection signal is output, a judgement is made that there are most probably editing points, and thus, the error correction is performed to editing-process the digital signal by changing the first decoder to the second decoder only for a predetermined time period, and the second editing-point detection signal is produced based upon the decoding result of the second decoder.

The second decoder, according to the preferred embodiment, owns the error correction and erasure correction capabilities, and the higher error detection capability, so that the editing-point can be correctly detected and the error correction capability can be improved.

RECORDING FORMAT

Figure 7A:
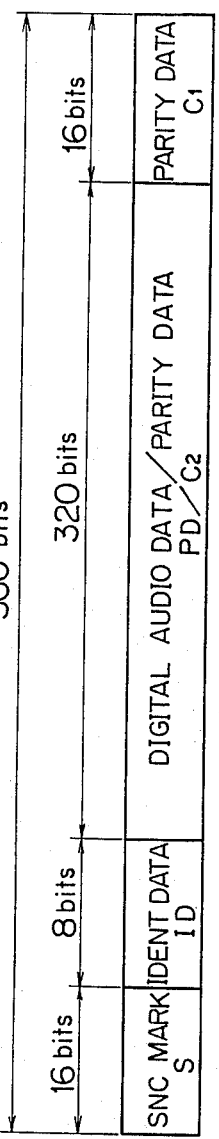
FIGS. 7A and 7B illustrate recording formats of the digital data employed, for instance, in the recording/reproducing apparatus 200 according to the first preferred embodiment of the invention.
Figure 7B:
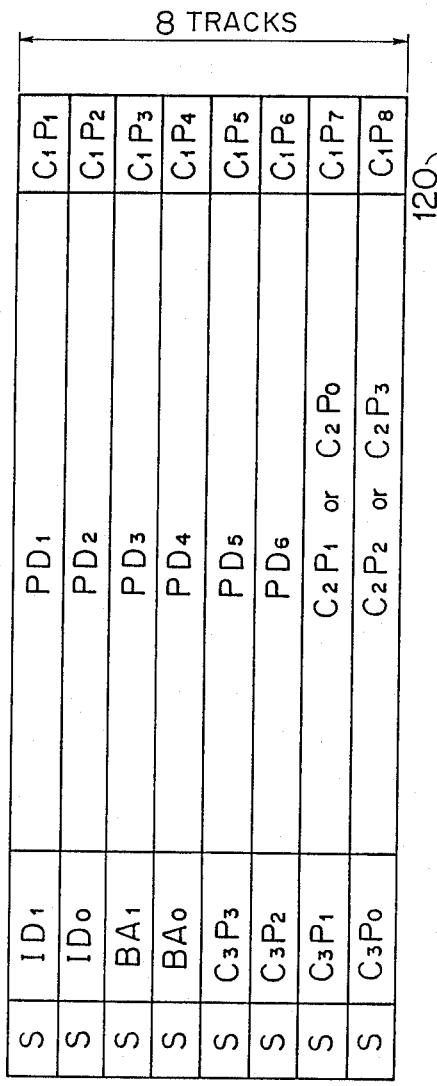

FIG. 7 is a recording format employed in the preferred embodiment. FIG. 7A illustrates a frame arrangement constituted by a 16-bit sync mark "S", an 8-bit identification data "I", 320-bit digital audio data "PD", or parity data "$C_2$" of the error correction code as the second error code, and parity data "$C_1$" for an error code or a detection code as a first error code which is given for every 16-bit frame. FIG. 7B illustrates a block arrangement constituted by digital audio data PD1 to PD6, $C_2$-parity data $C_2P_0$ to $C_2P_3$, and $C_1$-parity data $C_1P_1$ to $C_1$to $P_8$. Accordingly, the digital audio data is recorded on the 6 tracks and the $C_2$ parity data is recorded on the 2 tracks. This block arrangement is also constructed of the sampling frequency and quantizing bit number "$ID_1$" and "$ID_0$", as the identification data, and the $C_3$-parity data $C_3P_3$ to $C_3P_0$ which is added to the continuous 16-bit block numbers $BA_1$, $BA_0$, $ID_1$, $ID_0$, $BA_1$ and $BA_0$ for every block.

DATA/CODE INTERLEAVING

A description will now be described for interleaving the data and code with reference to FIG. 8.

FIG. 8 illustrates an interleaved data format. In FIG. 8, reference numerals (29-1) to (29-8) denote 8 tracks. The abscissa denotes frame numbers. Reference numerals 31 and 32 denote words in each frame of the respective tracks, i.e., the data of 2 channel X 16 bits. The digital audio data are arranged in the order of $W_0$, $W_1$, $W_2$, - - - $W_{11}$. The even data $W_0$, $W_2$, $W_4$ and the odd data $W_1$, $W_3$, $W_5$ are recorded on the magnetic tape 26 with the great separation. Also the even data adjoining to the odd data are recorded with four-block separation. It should be noted that the PCM data represented by $W_{1'}$, $W_{3'}$, - - - $W_{11'}$, correspond to the odd digital audio data which have been produced by delaying only the odd digital audio data $W_1$, $W_3$, - - - $W_{11}$ by a delay amount 8. In addition, the symbols $C_2P_0$, $C_2P_1$, $C_2P_2$ and $C_2P_3$ are the $C_2$-parity data which are produced for both the even audio data $W_0$, $W_2$, - - - , $W_{10}$ and the delayed odd audio data $W_{1'}$, $W_{3'}$, - - - $W_{11'}$. In this case, since one word is equal to, for instance, 32 bits, each word is divided into 8-bit data and the coding operation is carried out four times if the coding operation is performed based upon the Reed-Solomon code on GF($2^8$). If each symbol of the words divided by 8 bits is represented by "$W_{ni}$", and the check symbol is indicated by "$C_2P_{nj}$" (n=0, 1, 2, 3), the input data "V" is given as follows.

$$W = [w_{n0}, w_{n1'}, w_{n2}, w_{n3'}, \ldots W_{n10}, w_{n11'} C_2P_{n0}, C_2O_{n1}, C_2P_{n2}, C_2P_{n3}]$$

When the parity check matrix H is represented by:

$$H = \begin{pmatrix} 1 & 1 & 1 & 1 & 1 & \ldots & 1 & 1 \\ \alpha^{15} & \alpha^{14} & \alpha^{13} & \alpha^{12} & \alpha^{11} & \ldots & \alpha^1 & 1 \\ \alpha^{30} & \alpha^{28} & \alpha^{26} & \alpha^{24} & \alpha^{22} & \ldots & \alpha^2 & 1 \\ \alpha^{45} & \alpha^{42} & \alpha^{39} & \alpha^{36} & \alpha^{33} & \ldots & \alpha^3 & 1 \end{pmatrix}$$

the $C_2$-parity data $C_2P_0$ to $C_2P_3$ are generated so as to obtain the below-mentioned relationship:

$$v \cdot H^t = 0$$

It should be noted that "$\alpha$" is equal to, for instance, a root for the following primitive polynomial on GF($2^8$):

$$X^8 + X^4 + X^3 + X^2 + 1.$$

As previously described in detail, the odd digital audio data is separated from the even digital audio data. Even if the burst error may occur, the mean value interpolation can be effected by employing the digital data before and after the burst error, and also, the cross-fade is performed during the editing process by duplicating the digital audio signals before and after the editing point by means of the interpolation means for a given time period, so that the digital audio signals before and after the editing point can be smoothly connected to each other. The reason why the odd digital audio data having different delay times (amounts) have been employed, is to produce by the data correction, on error data concealment the even data from the odd data $W_1$, $W_3$, - - - $W_{11}$, thereby producing the continuous digital audio data when the correction cannot be effected by the $C_2$-code and the code data are completely in error.

ARRANGEMENT OF RECORDING/REPRODUCING APPARATUS OPERATED IN FIRST MODE

Figure 9:
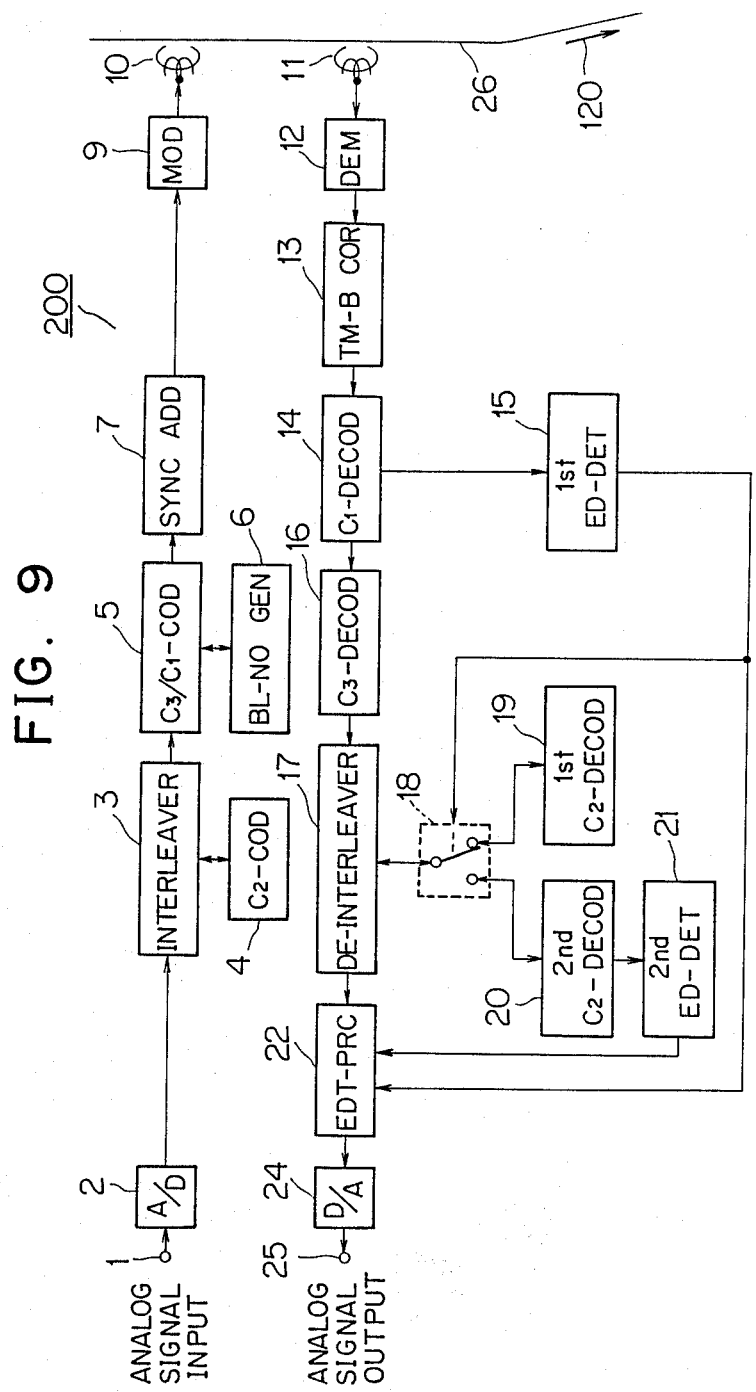
FIG. 9 is a schematic block diagram of the recording/reproducing apparatus 200 according to the first preferred embodiment of the invention.

Referring now to FIG. 9, a circuit arrangement of digital signal recording/reproducing apparatus 200 operated in the first mode, according to the invention, will be described in detail.

In FIG. 9, the input terminal 1 receives an analog signal derived from a signal source (not shown in detail), and the input analog signal is analog-to-digital converted into the desired digital signal, or data.

The recording system of the digital signal recording/reproducing apparatus 200, according to the preferred embodiment, includes an interleaving circuit 3 for interleaving the digital data supplied from the A/D converter 2; a $C_2$-coding circuit 4 connected to the interleaving circuit 3, for adding the $C_2$-code for parity data to the interleaved data; a $C_3/C_1$ coding circuit 5 for adding the parity data of $C_3$ and $C_1$ codes to the interleaved data from the interleaving circuit 3; a block number generating circuit 6 for outputting the block number to the $C_3/C_1$ coding circuit 5; a sync signal adding circuit 7 for adding the sync signal to the data output from the $C_3/C_1$ coding circuit 5; a modulator 9 for modulating the data derived from the sync signal adding circuit 7; and a recording head 10 for recording the modulated digital signal on the magnetic tape 26.

The reproducing system of the digital signal recording/reproducing apparatus 200 includes a reproducing head 11 for reproducing the digital signal containing the $C_1$, $C_2$ and $C_3$ codes and the sync signal from the magnetic tape 26; a demodulating circuit 12 for demodulating the data from the reproducing head 11; a time base correction circuit 13 connected to the demodulator 12, for removing the wow and flutter, and the jitters caused by the magnetic tape 26 and the tape drive mechanism; a $C_1$-decoding circuit 14 for decoding the digital data from the time base correction circuit 13 based upon the $C_1$ code contained therein; a $C_3$ decoding circuit 16 for decoding the digital data from the $C_1$-decoding circuit 14 based upon the $C_3$ code; a de-interleaving circuit 17 for de-interleaving the dispersed digital audio data from the $C_3$-decoding circuit 16 to rearrange them to the original data arrangement; a switch 18 for switching first and second $C_2$-decoding circuits 19 and 20 to be connected to the de-interleaving circuit 17 in response to the first editing-point detection signal; a first $C_2$-decoding circuit 19 having a higher error correction capability, for decoding the de-interleaved digital data based upon $C_2$-code of the parity data contained therein; and the second $C_2$-decoding circuit 20 having a higher error detection capability, for decoding the de-interleaved digital data based upon the $C_2$-code contained therein. That is to say, the first and second decoding circuits 19 and 20 correspond to the first and second decoders 80A and 80B of the Q-code decoding circuit 80 as illustrated in FIG. 5.

RECORDING OPERATION

In the recording system shown in FIG. 9, the analog signal input to the input terminal 1 is A/D-converted in the A/D converter 2 into the digital audio data ($W_0$, $W_1$, - - -, $W_{11}$) (see FIG. 8). The digital audio data are input into the interleaving circuit 3, and rearranged in the data sequence shown in FIG. 8. While the data is rearranged in the interleaving circuit 3, the Reed-Solomon coding operation is performed in the $C_2$-coding circuit 4. Thereafter, 16-bit block numbers BA1 and BA0 are generated in the block number generator 6, the digital data is $C_3$-coded in the $C_3/C_1$-coding circuit 5, as shown in FIG. 7, and then $C_1$-coded for every frame in the longitudinal direction (represented by an arrow 120 in FIG. 9) of the magnetic tape 26. Subsequently, the sync mark "S" is superimposed with the error correction coded data in the sync signal adding circuit 7. Then, the resultant data is modulated in the modulator 9 and recorded on the magnetic tape 26 by the magnetic head 10.

NORMAL REPRODUCING

When reproducing the normal magnetic tape 26, i.e., containing no editing point, the digital signal reproduced by the reproducing head 11 is demodulated in the demodulator 12 into the PCM signal, and thereafter, the jitters contained in the demodulated digital signal are absorbed and corrected in the time base correction circuit 13. Subsequently, the errors in the longitudinal direction of the magnetic tape 26 are detected in the $C_1$-decoding circuit 14, and the identification data "ID data" and the block numbers "$BA_1$" and "$BA_0$" are corrected in the $C_3$-decoding circuit 16. By utilizing the corrected block numbers $BA_1$ and $BA_0$, the digital data is input into the de-interleaving circuit 17, because the input digital data can be arranged into the original signal block. While the digital data input into the de-interleaving circuit 17 is rearranged therein, the error correction and error detection are performed in the first $C_2$-decoding circuit 19. It should be noted that the switch 18 is actuated to select the first $C_2$-decoding circuit 19 during the normal reproduction. Subsequently, the digital audio data converted into the time sequence ($W_0$, $W_1$, - - - $W_{11}$) and transferred directly to the D/A converter 24 via the editing process circuit 22 so as to be derived from the output terminal 25 as the original analog signal.

ERROR CORRECTION/DETECTION BY FIRST $C_2$-DECODER

In FIG. 10A, there is shown error correction/detection ranges of the first $C_2$-decoding circuit 19. The abscissa indicates error numbers, and the ordinate represents erasure numbers. The symbol "C" denotes a correctable region, the symbol "A" represents a region where the corresponding digital audio signal is interpolated based upon the information of the position at which the error is judged by the $C_1$-code, and the symbol "B" represents a region where all of the digital audio signals are interpolated since the error contained in the $C_2$-code has been detected, but the error position cannot be calculated. Further, the symbol "M" is a region where the correction is mistakenly performed. According to the digital signal recording/reproducing apparatus 200, the higher error correction capability is employed by which the capability belonging to the code is maximized for two-error correction, or four-erasure correction. Even if the missing occurs by the $C_1$-code, the error correction can be performed. As a result, the burst errors until 16 blocks can be corrected by performing the four-erasure correction in combination with the interleaved format as illustrated in FIG. 8. Also, the burst errors until 8 blocks can be corrected by performing the two-error correction even if the missing occurs by the $C_1$-code.

EDITING POINT REPRODUCING

Subsequently, the reproduction of the magnetic tape 26 containing the editing point will be described. In the reproducing system shown in FIG. 9, the first editing-point detector 15 produces the first editing-point detection signal based upon the decoding result of the $C_1$-decoding circuit 14 in case that the frame of each track contains errors, the number of which is greater than a predetermined number. This first editing-point detection signal functions as a selection signal for the switch 18 of the $C_2$-decoding circuits 19 and 20. When the first editing-point detection signal is output, a judgement is made that there is a possibility of the existence of the editing point, and therefore, the first $C_2$-decoding circuit 19 is changed over the second $C_2$-decoding circuit 20 by actuating the switch 18 so as to perform the editing process for the digital signal. The actuating time period of the switch 18 is determined by the time period during which the editing process is carried out in the editing process circuit 22.

After the first editing-point detection signal is output, the second editing-point detector 21 produces the second editing-point detection signal under the condition that the decoding operation by the second $C_2$-decoding circuit 20 is performed for a predetermined time period and thus, the above-described regions "B" are output at least one time, or a plurality of times continuously. The editing process circuit 22 judges, by receiving the first and second editing-point detection signals, the existence of predetermined editing points under the condition of that within a predetermined time period after the first editing-point detection signal is output, the second editing-point detection signal is output from the second editing-point detector 22. As a result, the editing process circuit 22 processes the digital audio signal to produce such a digital audio signal having a smooth signal continuity. In other words, the editing process circuit 22 AND-gates the signal reception of the first and second editing-point detection signals so as to decide requirements of the signal editing process.

ERROR CORRECTION/DETECTION REPRODUCING

FIG. 10B illustrates the error correction and error detection ranges of the second $C_2$-decoding circuit 20. The error correction capability of this second $C_2$-decoding circuit 20 is 1 (one)-error correction, or 3 (three)-erasure correction, which, as a result, is lower than the error correction capability of the first $C_2$-decoding circuit 19. However, the decoding algorithm of the second $C_2$-decoding circuit 20 is employed to surely detect the errors (the regions "B") by reducing the probability of occurrence of the error corrections (the regions "M") when the errors exceed its correction capability. FIG. 11 illustrates the error pattern containing the editing points in the codes. FIG. 11A shows the digital audio data containing only the data "$W_0$" located before the editing point, and no error detected by the $C_1$ code. That is to say, it corresponds to 0 (zero) error represented in FIG. 10B. In the second $C_2$ decoding circuit 20, 1-error correction is performed and the data located at "$W_0$" is used as the data after the editing point to reproduce the digital audio signal. In the editing process, both the data located before and after the editing point are duplicated by employing the interpolation means only for a predetermined time period. In this case, the time period required for the signal interpolation can be shortened by performing the error correction. FIG. 11B shows the case that the editing point is located between the data "$W_2$" and "$W_4$", and the error is detected by the $C_1$ code between the data "$W_2$" and "$W_4$". This error condition implies 2 erasures (marked "X" in FIG. 11B) and 1 error, where as a result of the $C_2$-decoding, the region "B" (i.e., the error detectable region) can be surely judged as apparent from FIG. 10B, and the erroneous correction is not effected because the error can be detected.

The second editing-point detection signal is output when the decoding results by the second $C_2$ decoding circuit 20 are judged as the region "B" continuously occurring at a given time. There are two error patterns when the region "B" is judged:

(1) In an error case, the code containing the editing point is arranged by the data having no correlation and located before and after the editing point, the data contains the errors exceeding the error correction capability by judging the data series before and after the editing point.

(2) In an error case, a plurality of errors are detected by means of the $C_1$-code, and no error judgement is made whether or not the error correction cannot be done by means of the $C_2$-code's correction capability, or the editing-point is contained in the code.

In the above (2), since the judgement cannot be done by the $C_2$-code, the editing process is performed, depending upon the first editing-point detection signal.

As previously described in detail, the digital signal recording/reproducing apparatus 200 according to the preferred embodiment, is accomplished by utilizing the basic idea of the digital signal reproducing according to the invention, as illustrated in FIG. 5.

The digital signal recording/reproducing apparatus 200 according to the preferred embodiment is characterized by employing the first editing-point detector 15 for detecting the editing point by way of the error distribution of the first error code; and the second editing-point detector 21 in combination with the second $C_2$-decoder 20 changed to be operative in response to the first editing-point detection signal, for performing the error correction and error detection based upon the second error code so as to detect the editing point based upon the error detection result by the second $C_2$-decoder 20, and characterized in that since a judgement is made of the detection of the actual editing point when the second editing-point detection signal is obtained from this second editing-point detector 21, the editing point can be surely detected and the error correction can be accomplished even for the editing section containing this editing point. Accordingly, the interpolation section can be shortened in the editing process and the digital sound quality can be improved.

MODIFICATIONS

In the above-described first mode embodiment, the Reed-Solomon code having the minimum code length of d=5 was employed as the error correction code $C_2$. It is however possible to employ the minimum code length of $d \geq 3$, resulting in the same advantage as the first mode embodiment.

In the above preferred embodiment, two types of different coding circuits as the first and second $C_2$-decoding circuits 19 and 20 have been employed. A programming control type decoding circuit may be utilized where two types of the control programs are selectively used, so that the total quantity of the decoding circuits is equal to a single decoding circuit with providing the same effects as the previous embodiment.

Moreover, in the preferred embodiment, the editing process was performed to improve the reliability when both the first and second editing-point detection signals were input into the editing process circuit 22. The editing process by the editing process circuit 22 may be performed when receiving only the second editing-point detection signal.

DIGITAL SIGNAL RECORDING/REPRODUCING APPARATUS OPERATED IN SECOND MODE

In digital signal recording/reproducing apparatus 300 operable in a second mode according to the present invention, both the recording format and the data/code interleaving method are the same as those of the digital recording/reproducing apparatus 200 shown in FIGS. 7 to 9. Accordingly, no further description will be made in the specification.

The typical operation of this digital signal recording/reproducing apparatus 300 will now be summarized.

The digital signal recording/reproducing apparatus 300 according to the preferred embodiment is characterized by comprising a first decoder having a higher correction capability, for performing both the error correction (i.e., the error correction is carried out by the Q-code even if the missing occurs by means of the P-code) and the erasure correction (i.e., the positional data detected by the P-code is corrected by means of the Q-code), and a second decoder having a higher error detection capability than that of the first decoder, and characterized in that existence of the editing point is judged when the simultaneous code errors occur in the longitudinal direction of the magnetic tape 26 over a predetermined number of the signal track and then, the first editing-point detection signal is output; the first decoder is changed by the second decoder during a time period required for the editing process; and when during the Q-code decoding operation, the Q-code is positioned across the editing point, an error detection flag by the P-code is compulsorily added to the predetermined data located before the editing point among the Q-code arranged data so as to perform the erasure correction by the data located after the editing point. Otherwise, the error detection flag by the P-code is compulsorily added to the predetermined data positioned after the editing point so as to perform the erasure correction by the data located before the editing point. As a result of the decoding by the second decoder, the second editing-point detection signal.

The function to compulsorily adding the error detection flag, according to the invention, is understood that the missing error which is caused by recognizing as a single code the data having no correlation with each other and located across the editing point, can be recognized as the erasure correction, and therefore, the error correction can be surely accomplished, avoiding the erroneous correction.

ARRANGEMENT OF RECORDING/REPRODUCING APPARATUS OPERATED IN SECOND MODE

Figure 12:
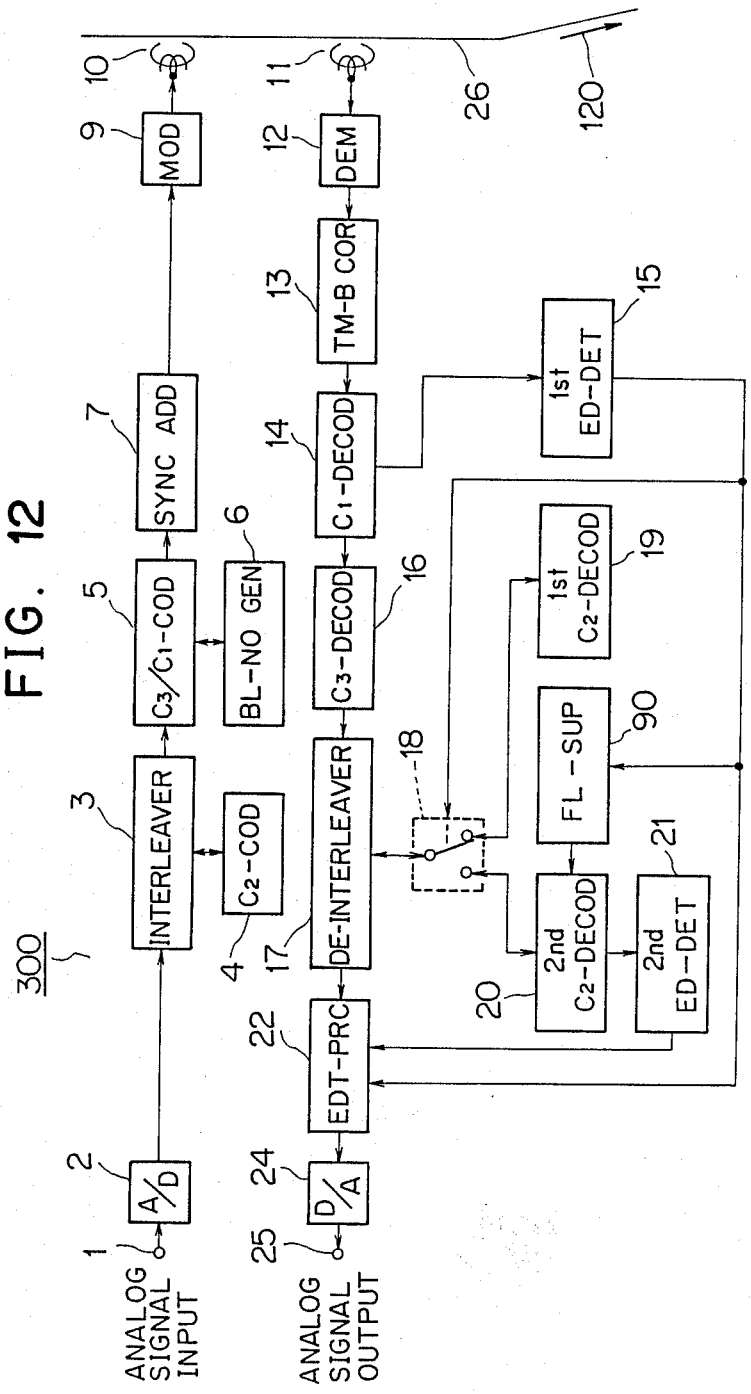
FIG. 12 is a schematic block diagram of the recording/reproducing apparatus 300 according to the second preferred embodiment of the invention.

An overall circuit arrangement of the digital signal recording/reproducing apparatus 300 operated in the second mode, according to the invention, is shown in FIG. 12.

As is readily understood from the circuit arrangement of the previous digital signal recording/reproducing apparatus 200 operated in the first mode, the digital signal recording system of the recording/reproducing apparatus 300 is the same as that of the recording/reproducing apparatus 200. No description of this digital signal recording system is therefore made in the specification.

Accordingly, only the digital signal reproducing system of the recording/reproducing apparatus 300 operated in the second mode will now be described in detail with reference to FIG. 12.

In the circuit arrangement shown in FIG. 12, as previously described, the predetermined PCM signal, i.e., the digital data has been recorded on the magnetic tape 26 by means of the recording head 10. This PCM signal is reproduced via the reproducing head 11 and demodulated by the demodulator 12 to obtain the predetermined digital audio data.

The reproducing system of the digital signal recording/reproducing apparatus 300 includes a reproducing head 11 for reproducing the digital signal containing the $C_1$, $C_2$ and $C_3$ codes and the sync signal from the magnetic tape 26; a demodulating circuit 12 for demodulating the data from the reproducing head 11; a time base correction circuit 13 connected to the demodulator 12, for removing the wow and flutter, and the jitters caused by the magnetic tape 26 and the tape drive mechanism; a $C_1$-decoding circuit 14 for decoding the digital data derived from the time base correction circuit 13 based upon the $C_1$-code contained therein; a $C_3$-decoding circuit 16 for decoding the digital data from the $C_1$-decoding circuit 14 based upon the $C_3$-code; a de-interleaving circuit 17 for de-interleaving the dispersed digital audio data supplied from the $C_3$-decoding circuit 16; a switch 18 for changing over the first and second $C_2$-decoding circuits 19 and 20 connected to the de-interleaving circuit 17 in response to the first editing-point detection signal; a first $C_2$-decoding circuit 19 having a higher error correction capability, for decoding the de-interleaved digital data based upon $C_2$-code of the parity data contained therein; a flag superimposing circuit 90 for compulsorily superimposing an error detecting flag by the $C_1$-code on the decoded digital data from the second $C_2$ decoding circuit 20; and the second $C_2$ decoding circuit 20 having a higher error detection capability, for decoding the de-interleaved digital data based upon the $C_2$ code contained therein.

NORMAL REPRODUCING OPERATION

Since the data recording operation is the same operation as that of the previous recording/reproducing apparatus 200, no description thereof is made in the specification.

Then, the normal reproducing operation, i.e., no editing process on the recording tape 26 will now be described in detail.

When reproducing the normal magnetic tape 26, i.e., containing no editing point, the digital signal reproduced by the reproducing head 11 is demodulated in the demodulator 12 into the PCM signal, and thereafter, the jitters contained in the demodulated digital signal are absorbed and corrected in the time base correction circuit 13. Subsequently, the errors in the longitudinal direction (indicated by the arrow 120) of the magnetic tape 26 are detected in the $C_1$-decoding circuit 14, and the identification data "ID data" and the block numbers "$BA_1$" and "$BA_0$" are corrected in the $C_3$-decoding circuit 16. By utilizing the corrected block numbers "$BA_1$" and "$BA_0$", the digital data is input into the de-interleaving circuit 17, because the input digital data can be arranged into the original signal block. While the digital data input into the de-interleaving circuit 17 is rearranged therein, the error correction and error detection are performed in the first $C_2$-decoding circuit 19. It should be noted that the switch 18 is actuated to select the first $C_2$-decoding circuit 19 during the normal reproduction. Subsequently, the digital audio data converted into the time sequence ($W_0$, $W_1$, - - - $W_{11}$) are transferred directly to the editing process circuit 22 so as to be derived from the output terminal 25 as the original analog signal.

EDITING POINT REPRODUCING

A description will now be given to the reproducing operation of the magnetic tape 26 containing the editing point. in the reproducing system shown in FIG. 12, the first editing-point detector 15 produces the first editing-point detection signal based upon the decoding result of the $C_1$-decoding circuit 14 in case that the frame of each track contains errors, the number of which is greater than a predetermined number. This first editing-point detection signal firstly functions as a selection signal for the switch 18 of the $C_2$-decoding circuits 19 and 20. When the first editing-point detection signal is output, a judgement is made that there is possibility of the existence of the editing point, and therefore the first $C_2$-decoding circuit 19 is changed over the second $C_2$-decoding circuit 20 by actuating the switch 18 so as to perform the editing process for the digital signal. The actuating time period of the switch 18 is determined by the time period, during which the editing process is carried out in the editing process circuit 22.

The first editing-point detection signal has a second function to give the positional information of the editing point to the flag superimposing circuit 90.

As previously described, in the reproducing operation for the digital data containing the editing point, both the error correction and error detection by the first and second $C_2$-decoding circuit 19 and 20 are selectively performed which is similar to the reproducing operation by the first-mode recording/reproducing apparatus 200. In this case, FIGS. 13A and 13B illustrate the error correction and error detection ranges, respectively. That is to say, FIG. 13A illustrates the error detection/correction ranges, whereas FIG. 13B illustrates the error correction/detection ranges. As is easily seen, the ranges of FIG. 13A is the same as those of FIG. 10A, but the ranges of FIG. 13B is different from those of FIG. 10B. That is to say, in the ranges of FIG. 13B, the error detection region "B" is increased, as compared with FIG. 10B.

Although the error correction capability of the second decoding circuit 20, is defined by 3 (three)-erasure correction which is lower than that of the first $C_2$-decoding circuit 19 (see FIG. 12A), the specific algorithm is employed in such a manner that the probability of occurrence of the erroneous correction (the region "M") is reduced as much as possible when the errors exceed the error correction capability, and the errors can be surely detected (the region "B"), according to the present embodiment.

FLAG SUPERIMPOSING

The flag data superimposing operation to the digital data by the flag superimposing circuit 90 will now be described in detail. Since this flag superimposing operation has the relationship with the error detection/correction by the second $C_2$-coding circuit 20, the flag superimposing operation will be described with reference to FIG. 13B.

It should be understood that, as previously described, the region indicated by the symbol "M" corresponds to the erroneous correction region exceeding the error correction capability of the corresponding $C_2$-coding circuit, the region represented by the symbol "B" corresponds to the error detection region, and the region denoted by the symbol "C" corresponds to the error correction region which is correctable.

Figure 14A:
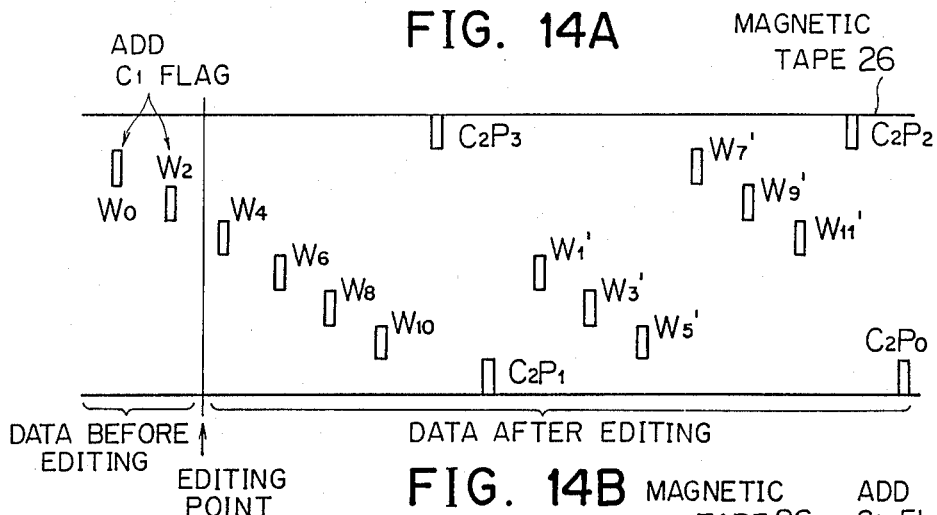
FIGS. 14A to 14C schematically illustrate the error patterns containing the editing points, for which the flag superimposing operation is carried out, for the recording/reproducing apparatus 300 shown in FIG. 12.
Figure 14B:
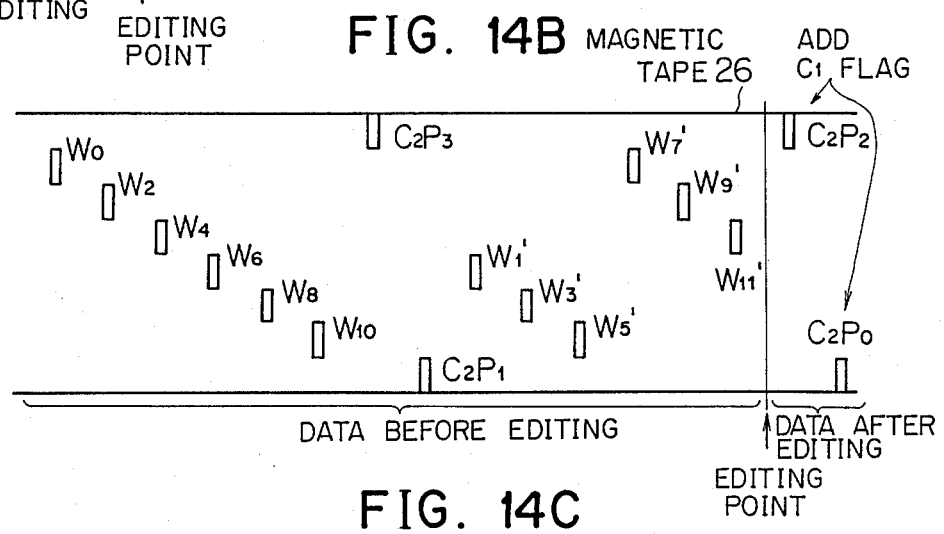

FIGS. 14A and 14B show the ranges of the flag superimposing positions within one block by the flag superimposing circuit 90. FIG. 14A illustrates the case where the editing positions based upon the first editing point detection signal are present in the front portion of the $C_2$-code (digital data $W_0$-$W_4$, excluding $W_4$) and the $C_1$-flag data is compulsorily superimposed with the data ($W_0$, $W_2$) located before the editing point. FIG. 14B illustrates the case where the editing points are present at the rear portion of the $C_2$ code (digital data $W_{11}$ to $C_2P_0$, excluding $W_{11}$), and the $C_1$-flag data is compulsorily added to the data ($C_2P_2$, $C_2P_0$) located after the editing point.

In FIG. 14A, the editing point is located inbetween the second data $W_2$ from the left corner and the third data $W_4$. Accordingly, this corresponds to 2 (two) errors (i.e., the error number is 2). Since the data illustrated in FIG. 14A have no mark "X", this corresponds to 2 errors, 0 erasure as illustrated in FIG. 13B. That is to say, this condition corresponds to the region "B" where although the errors in the $C_2$ code can be detected, all of this region "B" should be corrected, since the error position cannot be specified.

As a result, by operating the flag superimposing circuit 90, the $C_1$-flag is compulsorily added to all of the data $W_0$ and $W_2$ located before the editing point according to the preferred embodiment. Consequently, the error number is equal to "0 (zero)" and the erasure number is equal to "2 (two)". Therefore, this condition corresponds to the correctable error correction region "C", in view of the regions shown in FIG. 12B.

Next, in FIG. 14B, the condition of this editing point similarly corresponds to 2 errors and 0 erasure. As a result, as illustrated in FIG. 14B, the $C_1$-flag data is superimposed with the digital data $C_2P_2$ and $C_2P_0$ by actuating the flag superimposing circuit 90. Therefore, the same correction as in the error correction of FIG. 14A can be performed. In other words, in FIGS. 14A and 14B, 2 (two)-erasure correction is performed by compulsorily adding the $C_1$ flag data to the predetermined digital data so that both ends (8 blocks for each end) of the editing section can be corrected.

Figure 14C:
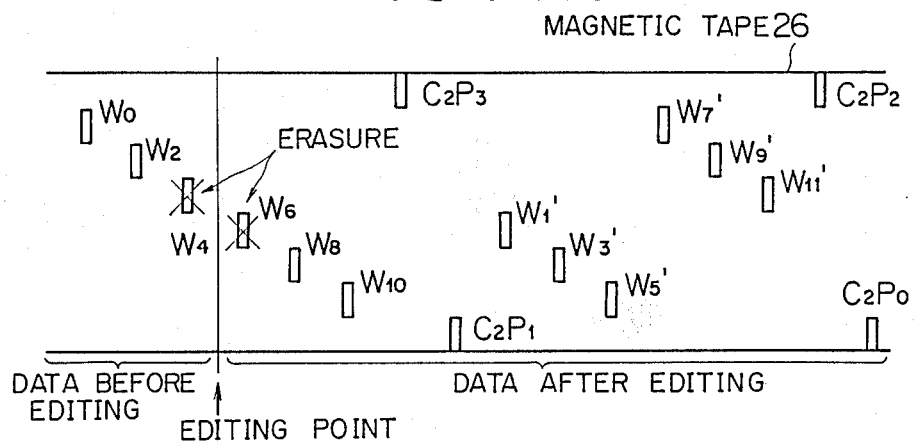

Finally, in FIG. 14C, the editing point is located between the third data $W_4$ from the right corner and the fourth data $W_6$, and the error is detected between the data $W_4$ and $W_6$ by means of the $C_1$ code. This error condition corresponds to 2 erasures and 2 errors which are surely determined as the region "B" by way of the range shown in FIG. 13B, as a result of the decoding by the second $C_2$-decoding circuit 20. Accordingly, since the error can be detected, no error correction is performed. Furthermore, simultaneously the second editing-point detection signal is output from the second editing-point detector 21.

EDITING PROCESS OPERATION

After the first editing-point detection signal is output, the second editing-point detector 21 produces the second editing-point detection signal under the condition that the decoding operation by the second $C_2$-decoding circuit 20 is performed only for a predetermined time period and thus, the above-described regions "B" are output at least one time, or a plurality of times continuously. The editing process circuit 22 judges, by receiving the first and second editing-point detection signals, the existence of predetermined editing points under the condition that within a predetermined time period after the first editing-point detection signal is output, the second editing-point detection signal is output from the second editing-point detector 22. As a result, the editing process circuit 22 processes the digital audio signal to produce such a digital audio signal having a smooth signal continuity. In other words, the editing process circuit 22 AND-gates the signal reception of the first and second editing-point detection signals so as to decide requirements of the signal editing process.

As previously described in detail, the feature of the digital signal recording/reproducing apparatus 300 operated in the second mode will now be summarized.

The digital signal recording/reproducing apparatus 300 according to the preferred embodiment is characterized by comprising the first decoder 19 having the higher correction capability, and the second decoder 22 having the higher error detection capability, which are selected by the first editing-point detection signal derived from the first editing-point detector 15, and is characterized in that since the error detection flag for the first error code is compulsorily added to the predetermined data located before, for after the first editing-point contained in the digital data recorded on the magnetic tape 26, the error correction can be performed even in the editing section in the digital data, the data interpolation section during the editing process can be shortened, and the second quality can be improved. Consequently, the digital signal recording/reproducing apparatus 300 is obtained where the error correction can be surely performed and the higher reliability can be realized.

MODIFICATIONS

As similarly in the previous preferred embodiment, the digital data recording/reproducing apparatus 300 according to this preferred embodiment, may be modified as follows.

In the preferred embodiment, the first editing-point detection signal was produced when the correction prohibited data portions were simultaneously detected by the $C_1$-code from the tracks more than predetermined track numbers. However, the first editing-point detection signal may be produced under the condition that a judgement for existence of the editing-point is made on the position where the continuity of the block addresses "$BA_1$" and "$BA_0$" as illustrated by the block format of FIG. 7B is lost.

Further, in the previous embodiment, although the first and second $C_2$-decoding circuits 19, 20 were required, only the second $C_2$-decoding circuit 20 may be employed if there is no practical problem in that the error correction capability during the normal reproduction is slightly lowered.

In the above preferred embodiment, two types of different coding circuits as the first and second $C_2$-decoding circuits 19 and 20 have been employed. A programming control type decoding circuit may be utilized where two types of the control programs are selectively used, sot hat the total quantity of the decoding circuits is equal to a single decoding circuit with providing the same effects as the previous embodiment.

The minimum code length (d=5) of the Reed-Solomon code was employed as the error correction code $C_2$ in the preferred embodiment, the present invention is not limited to this condition, but may be satisfied with $d \geq 3$.

Moreover, in the preferred embodiment, the editing process was performed to improve the reliability when both the first and second editing-point detection signals were input into the editing process circuit 22. The editing process by the editing process circuit 22 may be performed when receiving only the second editing-point detection signal.

DIGITAL SIGNAL RECORDING/REPRODUCING APPARATUS OPERATED IN THIRD MODE

In digital signal recording/reproducing apparatus 400 operable in a third mode according to the invention, the error correction can be performed during the punch in/out operation. Similarly, the digital signal recording-/reproducingapparatus 400 employs the same recording format and also the interleaved data format as in the previous digital signal recording/reproducing apparatus 200 and 300.

In summary, the digital signal recording/reproducing apparatus 400 operable in the third mode is characterized by comprising a first decoder for performing both an error correction and an erasure correction; and a second decoder having a higher error detection capability than that of the first decoder, and is characterized in that when the simultaneous code errors occur in the longitudinal direction, the numbers of which are more than a given track number, and also punch in/out identification signals are not detected, a judgement is made that probability of existence of the editing point is great so as to output a first editing-point detection signal, the first decoder is changed over the second decoder for a predetermined time period required for the editing process so as to perform the error correction, and the second editing-point detecting signal is obtained based upon the decoding result of the second decoder.

The punch in/out identification signal according to the preferred embodiment can remove the simultaneous code errors in the longitudinal direction produced from the first editing-point detection signal at the punch in/-out operations. Accordingly, the reliability of the first editing-point detection signal can be improved and the errors produced at the punch in/out operations can be corrected in the first decoder having the higher error correction capability.

DESCRIPTION OF IDENTIFICATION DATA

The identification data "$ID_1$" and "$ID_0$" employed in the preferred embodiment will now be described in detail with reference to FIG. 16.

Both MSB (Most Significant Bit) and "$B_6$" of the identification data $ID_1$ are used as a mode changing code, and in case of "00" (NORMAL), the identification code such as the sampling frequency, tape speed, and emphasis is allocated to the remaining bits of the identification data. In case of "01" (PUNCH IN), the identification information of the punch in/out is recorded on "$B_5$" and "$B_4$" of the identification data $ID_1$. At the punch in operation, "01" code is recorded during 4 blocks after the changing block from the recording operation to the reproducing operation. At the punch out operation, "10" (PUNCH OUT) code is recorded during 4 blocks before the changing block from the recording operation to the reproducing operation.

ARRANGEMENT OF DIGITAL SIGNAL RECORDING/REPRODUCING APPARATUS OPERATED IN THIRD MODE

Referring back to the circuit diagram shown in FIG. 15, the circuit arrangement of the digital recording/reproducing apparatus 400 will now be described.

Similarly, an analog signal is input via the input terminal 1 to the A/D converter 2 to derive the digital audio signal. In the recording system of the recording/reproducing apparatus 400, there are further provided a first switch 70 for selectively connecting an interleaving circuit 3 to either the A/D converter 2 or the editing-point process circuit 22; an interleaving circuit 3 for interleaving the digital data derived from the first switch 70; a $C_2$-coding circuit connected to the interleaving circuit 3, for adding a $C_2$-code to the data; a $C_3/C_1$ coding circuit 5 for adding $C_3$ and $C_1$ codes to the digital data from the interleaving circuit 3; a block number generating circuit 6 for outputting the block number to the $C_3/C_1$ coding circuit 5; a punch in/out identification signal generator for outputting the punch in/out identification signal to the $C_3/C_1$ coding circuit 5; a sync signal adding circuit 7 for adding the sync signal to the digital data from the $C_3/C_1$ coding circuit 5; a delay circuit 74 connected to the sync signal adding circuit 7 for adjusting the data recording timing to the punch in/out operations; a modulator 9 for modulating the digital data supplied from the delay circuit 74; and a recording head 10 for recording the modulated digital data on the magnetic tape 26.

In the reproducing system of the digital signal recording/reproducing apparatus 400, there are provided first and second reproducing heads 11A and 11B; a second switch 76 for selectively connecting a demodulator 12 to the first or second reproducing head 11A or 11B; a time base correction circuit 13 connected to the demodulator 12, for removing the wow and flutter, and the jitters caused by the magnetic tape 26 and the tape drive mechanism; a $C_1$-decoding circuit 14 for performing the data decoding based upon the $C_1$-code contained in the data from the time base correction circuit 13; a $C_3$-decoding circuit 16 for decoding the digital data from the $C_1$-decoding circuit 14 based upon the $C_3$-code; a punch in/out identification signal detector 78 connected to the $C_3$-decoding circuit 16; a de-interleaving circuit 17 for de-interleaving the dispersed digital data supplied from the $C_3$-decoding circuit 16; a third switch 18 for selectively changing the first and second $C_2$-decoding circuits 19 and 20 connected to the de-interleaving circuit 17 in response to the first editing-point detection signal; a first $C_2$-decoding circuit 19 having a higher error correction capability, for decoding the de-interleaved digital data based upon $C_2$ code of the parity data contained therein; and the second $C_2$-decoding circuit 20 having a higher error detection capability, for decoding the de-interleaved digital data based upon the $C_2$-code contained therein.

Furthermore, the recording/reproducing apparatus 400 further includes an editing process circuit 22 connected to the output of the de-interleaving circuit 17, for performing the editing process to the digital data in response to the first and second editing-point detection signals; a D/A converter 24 for digital-to-analog converting the digital data into the corresponding analog signal, i.e., the original analog signal; and an analog signal output terminal 25 for outputting the converted analog signal.

NORMAL RECORDING OPERATION

Recording operations will now be described. First, in the normal recording operation, the monitoring operation is simultaneously carried out in the following way. The analog signal input to the input terminal 1 is A/D-converted in the A/D converter 2 into the digital audio data ($W_0$, $W_1$, ..., $W_{11}$). The digital audio data are input via the first switch 70 into the interleaving circuit 3, and rearranged in the data sequence shown in FIG. 8. While the data is rearranged in the interleaving circuit 3 the Reed-Solomon coding operation is performed in the $C_2$-coding circuit 4. Thereafter, 16-bit block numbers "$BA_1$" and "$BA_0$" are generated in the block number generator 6, the digital data is $C_3$-coded in the $C_3/C_1$ coding circuit 5, as shown in FIGS. 7A and 7B, and then $C_1$-coded for every frame in the longitudinal direction (represented by an arrow 120 in FIG. 9) of the magnetic tape 26. Subsequently, the sync mark "S" is superimposed with the error correction coded data in the sync signal adding circuit 7 and time-delayed in the delay circuit 74. Then, the resultant data is modulated in the modulator 9 and recorded on the magnetic tape 26 by the magnetic head 10.

NORMAL REPRODUCING OPERATION

When reproducing the normal magnetic tape 26, i.e., containing no editing point, the digital signal reproduced by the second reproducing head 11B changed by the second switch 76 is demodulated in the demodulator 12 into the PCM signal, and thereafter, the jitters contained in the demodulated digital signal are absorbed and corrected in the time base correction circuit 13. Subsequently, the errors in the longitudinal direction of the magnetic tape 26 are detected in the $C_1$-decoding circuit 14, and the identification data "ID data" and the block numbers "$BA_1$" and "$BA_0$" are corrected in the $C_3$-decoding circuit 16. By utilizing the corrected block numbers "$BA_1$" and "$BA_0$", the digital data is input into the de-interleaving circuit 17, because the input digital data can be arranged into the original signal block. While the digital data input into the de-interleaving circuit 17 is rearranged therein, the error correction and error detection are performed in the first $C_2$-decoding circuit 19 which has been changed by the third switch 18. It should be noted that the third switch 18 is actuated to select the first $C_2$-decoding circuit 19 during the normal reproduction. Subsequently, the digital audio data converted into the time sequence ($W_0$, $W_1$, ... $W_{11}$) are transferred directly to the D/A converter 24 via the editing process circuit 22 so as to be derived from the output terminal 25 as the original analog signal.

PUNCH IN/OUT OPERATIONS

The punch in/out operations according to the preferred embodiment will now be described.

It should be noted that both the first and second switches 70 and 76 are first changed to the contacts $b_1$ and $b_2$, respectively. While monitoring the audio signal reproduced via the output terinal 25 by the first reproducing head 11A which has been changed by the second switch 76, the first switch 70 is changed to select the contact "$a_1$" in order to newly record the digital signal on the magnetic tape 26. The recording is performed by making the delay time in the de-interleaving circuit 17 and the interleaving circuit 3 plus the delay time in the delay circuit 74 coincident with the time for which the signal reproduced by the first reproducing head 11A has passed over the recording head 10. In this case, all of the tracks on the magnetic tape 26 can be substantially simultaneously rewritten.

In the block number generator 6, continuous block numbers are generated based upon the block number reproduced in the $C_3$-decoding circuit 16, so as to align the signal arrangement between the $C_2$-code and the digital signal which has been recorded on the magnetic tape during the punch in/out operations. In the recording/reproducing apparatus 400 according to the preferred embodiment, the particular feature exists in that the magnetic patterns at the punch in/out positions are distorted due to the wow and flutter even if the delay time of the delay circuit 74 is precisely adjusted, but, however, the original signal blocks can be rearranged even in the block number jamp or the block number superimposing during the reproduction since the block numbers "$BA_1$" and "$BA_0$" are recorded.

In FIG. 17A, there is shown error correction/detection ranges of the first $C_2$-decoding circuit 19. The abscissa indicates error numbers, and the ordinate represents erasure numbers. The symbol "C" denotes a correctable region, the symbol "A" represents a region where the corresponding digital audio signal is interpolated based upon the information of the position at which the error is judged by the $C_1$-code, and the symbol "B" represents a region where all of the digital audio signals are interpolated since the error contained in the $C_2$ code has been detected, but the error position cannot be calculated. Further, the symbol "M" is a region where the correction is mistakenly performed. According to the digital signal recording/reproducing apparatus 400, the higher error correction capability is employed by which the capability belonging to the code is maximized for two-error correction, or four-erasure correction. Even if the missing occurs by the $C_1$-code, the error correction can be performed. As a result, the burst errors until 16 blocks can be corrected by performing the four-erasure correction in combination with the interleaved format as illustrated in FIG. 8. Also, the burst errors until 8 blocks can be corrected by performing the two-error correction even if the missing occurs by the $C_1$-code. Consequently, the errors occurring at the punch in/out position can be surely corrected.

EDITING-POINT REPRODUCING

Subsequently, the reproduction of the magnetic tape 26 containing the editing point will be described. In the reproducing system shown in FIG. 15, first editing-point detector 15 produces the first editing-point detection signal based upon the decoding result of the $C_1$-decoding circuit 14 in case that the frame of each track contains errors, the number of which is greater than a predetermined number and no punch in/out identification signal is derived from the punch in/out identification signal detector 78. The punch in/out identification signal detector 78 detects whether or not the punch-in information is present in a predetermined block before or after the simultaneous frame error positions in each track, and then, removes the frame simultaneous errors in each track at the punch in/out positions. This first editing-point detection signal functions as a selection signal for the switch 18 of the $C_2$-decoding circuits 19 and 20. When the first editing-point detection signal is output, a judgement is made that there is a possibility of the existence of the editing point, and therefore, the first $C_2$-decoding circuit 19 is changed over the second $C_2$-decoding circuit 20 by actuating the third switch 18 so as to perform the editing process for the digital signal. The actuating time period of the third switch 18 is determined by the time period during which the editing process is carried out in the editing process circuit 22.

After the first editing-point detection signal is output, the second editing-point detector 21 produces the second editing-point detection signal under the condition that the decoding operation by the second $C_2$-decoding circuit 20 is performed for a predetermined time period and thus, the above-described regions "B" are output at least one time, or a plurality of times continuously. The editing process circuit 22 judges, by receiving the first and second editing-point detection signals, the existence of predetermined editing points under the condition that within a predetermined time period after the first editing-point detection signal is output, the second editing-point detection signal is output from the second editing-point detector 22. As a result, the editing process circuit 22 proceses the digital audio signal to produce such a digital audio signal having a smooth signal continuity.

FIG. 17B illustrates the error correction and error detection ranges of the second $C_2$-decoding circuit 20. The error correction capability of this second $C_2$-decoding circuit 20 is 1 (one)-error correction, or 3 (three)-erasure correction, which, as a result, is lower than the error correction capability of the first $C_2$-decoding circuit 19. However, the decoding algorithm of the second $C_2$-decoding circuit 20 is employed to surely detect the errors (the regions "B") by reducing the probability of occurrence of the erroneous correction (the regions "M") when the errors exceed its correction capability.

ERROR PATTERN

Figure 18A:
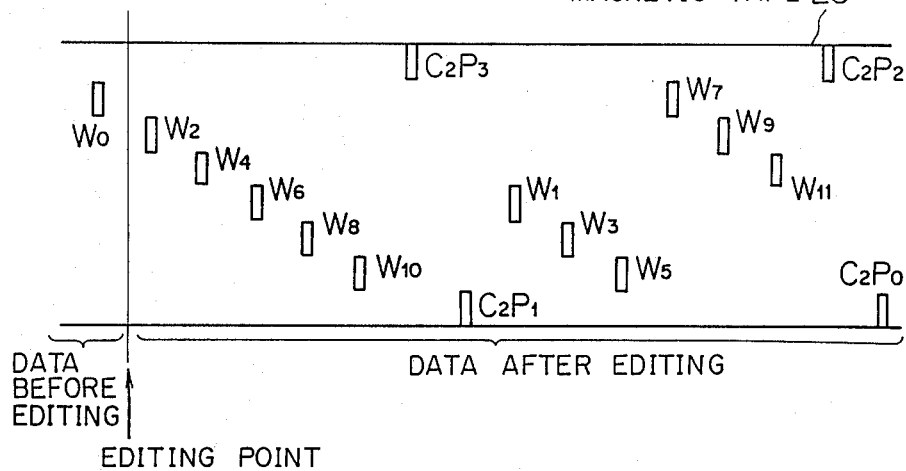

FIG. 18 illustrates the error pattern containing the editing points in the codes. FIG. 18A shows the digital audio data containing only the data "$W_0$" located before the editing point, and no error detected by the $C_1$-code. In the second $C_2$-decoding circuit 20, 1-error correction is performed, and the data located at "$W_0$" is used as the data after the editing point to reproduce the digital audio signal.

Figure 18B:
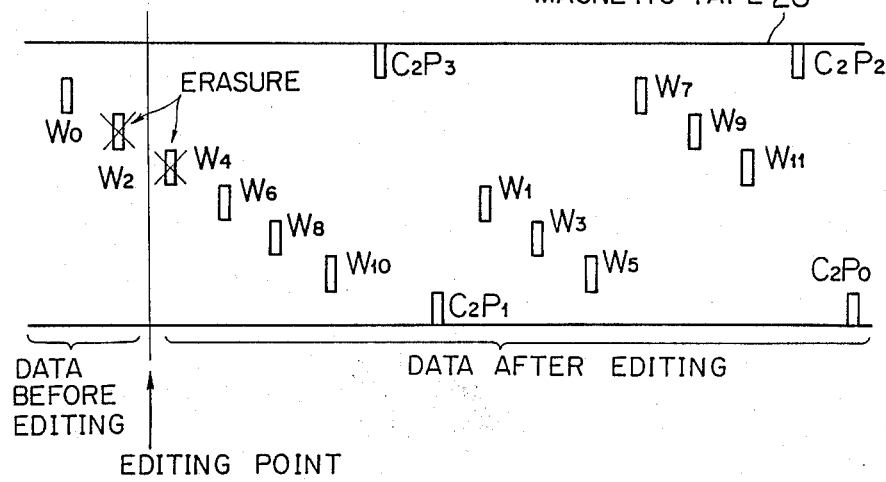

In such an error pattern, the error number of FIG. 17B is equal to 1 (one), and the erasure number is equal to 0 (zero). Consequently, this corresponds to the region "C", as previously described, which corresponds to the correctable region. In the editing process, both the data located before and after the editing point are duplicated by employing the correction means (not shown in detail) for a predetermined time period. In this case, the time period required for the signal correction can be shortened by performing the error correction. FIG. 18B shows the case that the editing point is located between the data "$W_2$" and "$W_4$", and the error is detected by the $C_1$-code between the data "$W_2$" and "$W_4$". That is to say, this condition corresponds to 1 error shown in FIG. 10B. This error condition implies 2 erasures (marked "X" in FIG. 18B) and 1 error, where as a result of the $C_2$-decoding, the region "B" (i.e., the error detectable region) can be surely judged as apparent from FIG. 17B, and the error correction is not required because the error can be detected.

The error pattern shown in FIG. 18B will now be described in detail, where the editing point is located between the second digital data "$W_2$" from the left corner and the third digital data "$W_4$". Accordingly, this error pattern corresponds to the error number "1" of FIG. 17B. Furthermore, as the mark "X" has been added to two pieces of the digital data $W_2$ and $W_4$, this condition corresponds to the erasure number "2" of FIG. 17B. Accordingly, as is apparent from the diagram of FIG. 17B, the data position of existence of the editing point corresponds to the region "B". As previously described, in this region "B", the error in the $C_2$-code can be detected, and all of the digital data present in this code must be corrected. It should be, however, noted that no error correction is performed.

It is understood that the concealment of the digital data (digital audio signal) implies the following data concealing conditions. That is to say, the error in the code at this position is detected, and all of the digital signals present in the error-corrected code are concealed by utilizing the digital signals around the error code, assuming that there is a correlation relationship between the digital signal at the position of the error detection and the digital signal around the digital signal at the error-detected position.

The error correction (e.g., region "M"), on the other hand, implies that based upon the digital data around the dropouts and error-detected digital data, this dropout digital data is corrected.

The second editing-point detection signal is output when the decoding results by the second $C_2$-decoding circuit 20 are judged as the region "B" continuously occurring at a given time. There are two error patterns when the region "B" is judged. Since these error patterns are the same as those of the previous recording/reproducing apparatus 200, no further explanation is made in the specification.

The operation of the digital signal recording/reproducing apparatus 400 operated in the third mode will now be summarized.

When the correction-prohibited data conditions more than a predetermined track number simultaneously are detected, and the punch in/out identification signal is detected, a judgement is made that this error is generated by the punch in/out operations. Accordingly, the decoding operation is performed by actuating the first $C_2$-decoding circuit 19 having the higher error correcting capability, so that the errors occurring in the punch in/out operations can be surely corrected. When the punch in/out identification signal is not detected, the first editing-point detection signal is output and a judgement is made that the probability of existence of the editing point becomes great. As a result, since the second $C_2$-decoding circuit 20 having the higher error detection capability is brought into the operation, the error correction can be performed even in the editing section without continuously performing the error correction and also the editing point can be surely detected, resulting in the reliable signal recording/reproducing apparatus 400.

MODIFICATIONS

In the preferred embodiment shown in FIG. 15, the punch in/out identification signal was recorded on the ID area of the main track (8 tracks) for recording the digital audio signal. However, this identification signal may be recorded on an auxiliary track other than the main track, and a recording/reproducing circuit may be additionally employed for the auxiliary track, so that the same effect can be achieved by recording/reproducing the punch in/out identification signal under the same timing conditions.

In the above-described third mode embodiment, the Reed-Solomon code having the minimum code length of $d=5$ was employed as the error correction code $C_2$. It is however possible to employ the minimum code length of $d \geq 3$, resulting in the same advantage as the first mode embodiment.

In the above preferred embodiment, two types of different coding circuits as the first and second $C_2$-decoding circuits 19 and 20 have been employed. A programming control type decoding circuit may be utilized where two types of the control programs are selectively used, so that the total quantity of the decoding circuits is equal to a single decoding circuit with providing the same effects as the previous embodiment.

Moreover, in the preferred embodiment, the editing process was performed to imprve the reliability when both the first and second editing-point detection signals were input into the editing process circuit 22. The editing process by the editing process circuit 22 may be performed when receiving only the second editing-point detection signal.

What is claimed is:

1. A digital signal reproducing apparatus comprising:
   means for reproducing digital signal data containing at least main signal data, an error detecting code, and an error correcting code, from multitracks of a recording medium;
   means for checking the error detecting code from the reproduced digital signal data to produce a checking signal;
   first editing-point detecting means for receiving the checking signal from the checking means to produce a first editing-point detection signal;
   first decoding means having an error correcting capability, for decoding the digital signal data derived from the checking means so as to correct the main signal data based upon the error correcting code;
   second decoding means having an error detecting capability, for decoding the digital signal data derived from the checking means so as to detect the error detecting code;
   second editing-point detecting means for producing a second editing-point detection signal when the second detecting means detects the error detecting code from the digital signal data;
   editing means for editing the digital signal data when at least one of said first and second editing-point detection signals are produced; and
   selecting means for selecting one of said first and second decoding means to be operative based upon said first editing-point detecting signal.

2. A digital signal reproducing apparatus comprising:
   a magnetic head for magnetically reproducing digital signal data recorded on mult-tracks of a magnetic tape, said digital signal data being superimposed with at leat first and second error codes;
   checking means for checking said first error code contained in the digital signal data reproduced by the magnetic head to derive a check result signal;
   first detecting means for producing a first editing-point detection signal in response to the check result signal derived from the checking means;
   first decoding means for decoding the reproduced digital signal data based upon the second error code contained therein;
   second decoding means having a higher error detecting capability than that of the first decoding means, for decoding the reproduced digital signal data based upon the second error code contained therein;
   switching means for selectively switching the first and second decoding means in response to the first editing-point detection signal derived from the first detecting means;
   second detecting means for producing a second editing-point detection signal based upon a check result of the second decoding means; and,
   editing means for editing the reproduced digital signal data in response to the second editing-point detection signal.

3. A digital signal reproducing apparatus as claimed in claim 2, wherein said first detecting means outputs said first editing-point detection signal under the condition that the error code detection by the checking means occurs on the multitracks in concentrated conditions.

4. A digital signal reproducing apparatus as claimed in claim 2, wherein said second detecting means outputs said second editing-point detection signal when the error code detection is performed by the second decoding means.

5. A digital signal reproducing apparatus as claimed in claim 2, wherein said editing means recognizes as an editing point a time instant at which said second editing-point detection signal is produced from the second detecting means, and cross-fades the digital signal data with each other which have been acquired before and after the editing point on the reproduced digital signal data.

6. A digital signal reproducing apparatus as claimed in claim 2, wherein said first error code is a parity check code within one signal track.

7. A digital signal reproducing apparatus as claimed in claim 2, wherein said second error code is a parity check code over a plural signal track.

8. A digital signal reproducing apparatus comprising:
a magnetic head for magnetically reproducing digital signal data recorded on multi-tracks of a magnetic tape, said digital signal data being superimposed with at least first and second error codes;
checking means for checking said first error code contained in the digital signal data reproduced by the magnetic head to derive a check result signal;
first detecting means for producing a first editing-point detection signal in response to the check result signal derived from the checking means;
superimposing means for superimposing an error flag on the reproduced digital signal data adjacent an editing point on the digital signal data in response to the first editing-point detection signal derived from the first detecting means;
first decoding means for decoding the reproduced digital signal data based upon the second error code contained therein;
second decoding means having a higher error detecting capability than that of the first decoding means, for decoding the reproduced digital signal data based upon the second error code and the error flag contained therein;
switching means for selectively switching the first and second decoding means in response to the first editing-point detection signal derived from the first detecting means;
second detecting means for producing a second editing-point detection signal based upon a check result of the second decoding means; and,
editing means for editing the reproduced digital signal data in response to the second editing-point detection signal.

9. A digital signal reproducing apparatus as claimed in claim 8, wherein said second decoding means decodes the reproduced digital signal data by utilizing digital signal data containing no error flag.

10. A digital signal reproducing apparatus as claimed in claim 8, wherein said first detecting means outputs said first editing-point detection signal under the condition that the error code detection by the checking means occurs on the multi-tracks in concentrated conditions.

11. A digital signal reproducing apparatus as claimed in claim 8, wherein said second detecting means outputs said second editing-point detection signal when the error code detection is performed by the second decoding means.

12. A digital signal reproducing apparatus as claimed in claim 8, wherein said editing means recognizes as an editing point a time instant at which said second editing-point detection signal is produced from the second detecting means, and cross-fades the digital signal data with each other which have been acquired before and after the editing point on the reproduced digital signal data.

13. A digital signal reproducing apparatus as claimed in claim 8, wherein said first error code is a parity check code within one signal track.

14. A digital signal reproducing apparatus as claimed in claim 8, wherein said second error code is a parity check code over a plural signal track.

15. A digital signal reproducing apparatus comprising:
a magnetic head for magnetically reproducing digital signal data recorded on multi-tracks of a magnetic tape, said digital signal data being superimposed with at least first and second error codes and punch in/out signals;
first checking means for checking said first error code contained in the digital signal data reproduced by the magnetic head to derive a first check result signal;
second checking means for checking said punch in/out signals contained in the digital signal data reproduced by the magnetic head to derive a second check result signal;
first detecting means for producing a first editing-point detection signal in response to the first and second check result signals derived from the first and second checking means;
first decoding means for decoding the reproduced digital signal data based upon the second error code contained therein;
second decoding means having a higher error detecting capability than that of the first decoding means, for decoding the reproduced digital signal data based upon the second error code contained therein;
switching means for selectively switching the first and second decoding means in response to the first editing-point detection signal derived from the first detecting means;
second detecting means for producing a second editing-point detection signal based upon a check result of the second decoding means; and,
editing means for editing the reproduced digital signal data in response to the second editing-point detection signal.

16. A digital signal reproducing apparatus as claimed in claim 15, wherein said first detecting means outputs said first editing-point detection signal under the condition that the error code detection by the first checking means occurs on the multi-tracks in concentrated conditions, and also no punch in/out signals are detected by the second checking means.

17. A digital signal reproducing apparatus as claimed in claim 15, wherein said second detecting means outputs said second editing-point detection signal when the error code detection is performed by the second decoding means.

18. A digital signal reproducing apparatus as claimed in claim 15, wherein said editing means recognizes as an editing point a time instant at which said second editing-point detection signal is produced from the second detecting means, and cross-fades the digital signal data with each other which have been acquired before and after the editing point on the reproduced digital signal data.

19. A digital signal reproducing apparatus as claimed in claim 15, wherein said first error code is a parity check code within one signal track.

20. A digital signal reproducing apparatus as claimed in claim 15, wherein said second error code is a parity check code over a plural signal track.

* * * * *